(12) United States Patent
Duarte et al.

(10) Patent No.: US 11,509,132 B2
(45) Date of Patent: Nov. 22, 2022

(54) INTELLIGENT WINDOW HEAT CONTROL SYSTEM

(71) Applicant: PPG Industries Ohio, Inc., Cleveland, OH (US)

(72) Inventors: Nicolas B. Duarte, Allison Park, PA (US); Yu Jiao, Blawnox, PA (US); Khushroo H. Lakdawala, Santa Clarita, CA (US); Arthur C. Scott, Owens Cross Roads, AL (US); Monroe A. Stone, Gurley, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 707 days.

(21) Appl. No.: 16/448,465

(22) Filed: Jun. 21, 2019

(65) Prior Publication Data
US 2019/0319451 A1    Oct. 17, 2019

Related U.S. Application Data

(60) Continuation of application No. 16/107,169, filed on Aug. 21, 2018, now Pat. No. 10,374,416, which is a
(Continued)

(51) Int. Cl.
*H02H 9/02* (2006.01)
*H05B 3/86* (2006.01)
(Continued)

(52) U.S. Cl.
CPC .............. *H02H 9/02* (2013.01); *B64C 1/1476* (2013.01); *B64D 15/12* (2013.01); *H05B 1/0236* (2013.01);
(Continued)

(58) Field of Classification Search
CPC ... H02H 9/02; H05B 3/86; H05B 1/02; H05B 2203/035; H05B 1/0236; H05B 2203/016;
(Continued)

(56) References Cited

U.S. PATENT DOCUMENTS 3,762,902 A    10/1973   Wagner et al.
4,078,107 A    3/1978    Bitterice et al.
(Continued)

FOREIGN PATENT DOCUMENTS

EP    0349915 A1    1/1990
EP    0367210 A2    5/1990
(Continued)

OTHER PUBLICATIONS

Search Report for PCT/US2012/054162 dated Nov. 5, 2012.
Search Report for PCT/US2016/013191 dated Jun. 29, 2016.

*Primary Examiner* — Danny Nguyen
(74) *Attorney, Agent, or Firm* — Neil J. Friedrich

(57) ABSTRACT

A system for monitoring performance of an aircraft windshield includes a sensor comprising a sensory contact and an evaluation unit. The sensory contact is in physical contact with one or more components of the windshield, and generates a signal representative of the performance of the component(s) of the windshield. An electrical connector is secured to the surface of the windshield facing the interior of the aircraft. The signal from the sensory contact passes through the connector to the evaluation unit. The evaluation unit acts on the signal to determine the performance of the component(s) of the windshield, wherein the evaluation unit is spaced from and out of physical contact with the windshield and the electrical connector, and is in electrical contact with the electrical connector.

20 Claims, 12 Drawing Sheets

Related U.S. Application Data continuation of application No. 14/633,392, filed on Feb. 27, 2015, now Pat. No. 10,063,047, which is a continuation-in-part of application No. 14/622,981, filed on Feb. 16, 2015, now Pat. No. 9,166,400, which is a division of application No. 13/247,131, filed on Sep. 28, 2011, now Pat. No. 8,981,265.

(51) Int. Cl.
  *B64C 1/14* (2006.01)
  *H05B 1/02* (2006.01)
  *B64D 15/12* (2006.01)

(52) U.S. Cl.
  CPC ......... *H05B 3/86* (2013.01); *H05B 2203/016* (2013.01); *H05B 2203/035* (2013.01)

(58) Field of Classification Search
  CPC ......... B64C 1/14; B64C 1/1476; B64D 15/12; B60L 1/02; G01N 25/56
  USPC ........................................................ 361/218
  See application file for complete search history.

(56) References Cited

U.S. PATENT DOCUMENTS

| | | |
|---|---|---|
| 4,610,771 A | 9/1986 | Gillery |
| 4,621,249 A | 11/1986 | Uchikawa et al. |
| 4,623,389 A | 11/1986 | Donley et al. |
| 4,793,175 A | 12/1988 | Fedter et al. |
| 4,806,220 A | 2/1989 | Finley |
| 4,829,163 A | 5/1989 | Rausch et al. |
| 4,894,513 A | 1/1990 | Koontz |
| 4,894,514 A | 1/1990 | Delvin |
| 4,902,875 A | 2/1990 | Koontz |
| 4,939,348 A | 7/1990 | Criss |
| 4,994,650 A | 2/1991 | Koontz |
| 5,354,966 A * | 10/1994 | Sperbeck ................. H05B 3/84 219/203 |
| 5,675,944 A | 10/1997 | Kerr et al. |
| 5,821,001 A | 10/1998 | Arbab et al. |
| 6,107,611 A * | 8/2000 | Jones ..................... H01Q 3/005 219/505 |
| 6,535,126 B2 | 3/2003 | Lin et al. |
| 8,082,979 B2 | 12/2011 | Greiner et al. |
| 8,155,816 B2 | 4/2012 | Rashid et al. |
| 8,383,994 B2 | 2/2013 | Rashid et al. |
| 2003/0127452 A1 | 7/2003 | Gerhardinger et al. |
| 2007/0002422 A1 | 1/2007 | O'Shaughnessy |
| 2010/0163675 A1* | 7/2010 | Rashid ................. B64C 1/1484 73/75 |
| 2013/0075531 A1 | 3/2013 | Jiao et al. |
| 2014/0097177 A1* | 4/2014 | Rochell ................. B64D 15/12 219/486 |

FOREIGN PATENT DOCUMENTS

| | | |
|---|---|---|
| GB | 1401497 A | 7/1975 |
| WO | 2013048698 A1 | 4/2013 |
| WO | 2014002218 A1 | 1/2014 |

* cited by examiner

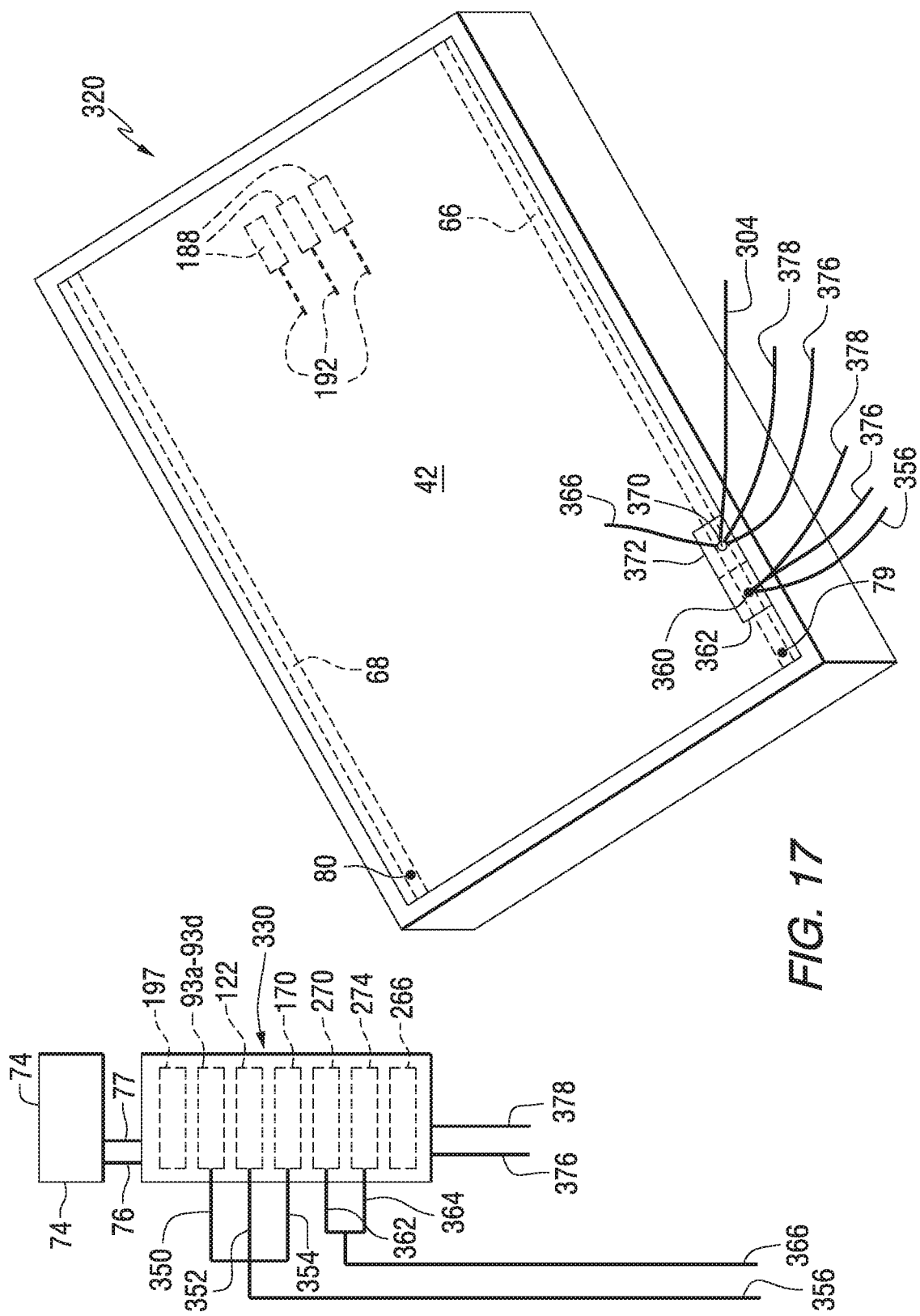

INTELLIGENT WINDOW HEAT CONTROL SYSTEM

BACKGROUND OF THE INVENTION

1. Field of the Invention

This invention relates to an intelligent window heat control system for a vehicle, e.g., but not limited to an aircraft, and more particularly, to a control sensor or sensor system for an aircraft including, among other things, a sensor that is physically attached to the measurement component or target, and a sensor evaluation unit that provides intelligent data processing to arrive at a conclusion or measurement result of the performance of an article of the aircraft, e.g., but not limited to a heatable member of an aircraft windshield, and optionally to take action to alter current flow to the heatable member based on the measurement result.

2. Presently Available Technology

At the present time, windows or transparencies for vehicles, e.g., but not limited to windshields for aircrafts, have sensors to determine performance of the windshield and a control system to take action when the performance of the windshield is operating outside of acceptable operating limits to prevent damage to the windshield. A detailed discussion of transparencies, e.g., but not limited to aircraft windshields having sensors and control systems, is disclosed in U.S. Pat. Nos. 8,155,816; 8,383,994; and 8,981,265. U.S. Pat. Nos. 8,155,816 and 8,383,994 in their entirety are hereby incorporated by reference.

For purposes of this invention, the sensors operating on an article, e.g., but not limited to a windshield, are considered to include two components or sub-operating systems. For purposes of clarity, one component or sub-operating system of the sensor is referred to as the "sensory portion" of the sensor, and the second component or second sub-operating system is referred to as the "evaluation unit" of the sensor. The sensory portion is effected by the changes to the article or component under observation, e.g., but not limited to heating the heatable member of a windshield to remove snow, ice, and fog from the outer surface of the windshield, and the sensory portion forwards a signal, usually but not limited to an electric signal, to the evaluation unit. The evaluation unit acts on the signal from the sensory portion to monitor the operating condition of the article or component, and forwards a signal, usually an electric signal, representing the operating condition of the article to a control system.

When the article is operating within acceptable limits, it is expected that the sensory portion, and/or the evaluation unit, indicates that no action is to be taken; however, when the article is operating outside of acceptable limits, action is taken by the heater controller, e.g., but not limited to disconnecting the heatable member and its electrical power source from one another, to prevent damage to the windshield and/or the aircraft.

One of the limitations of the presently available system is that the sensory portion, and the evaluation unit, are mounted on the article, e.g., but not limited to a windshield, being monitored. Although the present practice is acceptable, there are limitations. More particularly, each windshield must have a sensory portion mounted on the article with the evaluation unit also mounted on the article. As can now be appreciated, it would reduce the cost of the windshield if the performance measuring portion of the sensor was mounted on the aircraft instead of the windshield. Additionally, in some cases it may be possible to monitor the status of the article without a sensory portion connected to the article using remote measurement methods. In this manner, an evaluation unit mounted on the aircraft can be assigned to service a particular windshield position, and the sensory portion of a windshield mounted in the particular windshield position is connected to the performance measuring portion assigned to service the particular windshield position. With the above arrangement, the need to provide each windshield with an evaluation unit is eliminated.

SUMMARY OF THE INVENTION

This invention relates to a system for monitoring performance of an article, or a component of an article of a vehicle, the system includes a sensor including a sensory contact and a sensory performance evaluation unit. The sensory contact is in physical contact with the article or the component of the article, and generates a signal representative of the performance of the article or the component of the article, wherein the evaluation unit acts on the signal to determine the performance of the article or the component of the article. The sensory performance evaluation unit is spaced from, and out of physical contact with, the article and the electrical connector.

The invention further relates to an improved aircraft windshield of the type having a sensor. The sensor includes a sensory contact acting on a component of the windshield and an evaluation unit, wherein the sensory contact is in physical contact with the component of the windshield, and generates a signal representative of the performance of the component of the windshield. The signal is acted on by the evaluation unit of the spacer to determine the performance of the component of the windshield, wherein the sensory performance evaluation unit is in physical contact with the windshield and is in electrical contact with the sensory contact. The improvement includes, but is not limited to the evaluation unit spaced from and out of physical contact with the windshield, and in electrical contact with the electrical connector, and the sensory contact of the spacer.

The invention still further relates to a transparency for a vehicle including, among other things, a heatable member including, among other things, an electric heatable film, a pair of spaced bus bars on the heatable film and wires connecting the bus bars to switches and electric power, wherein when selected switches are in the closed positions, current moves through the bus bars to heat the film and, when selected ones of the switches are in the open position, there is no current moving through the bus bars. Electrical wires are connected to the circuit and extending out of the transparency to provide external electrical access to the circuit; and a sensor electrically to an end of the wires, wherein the sensor moves the selected ones of the switch to the open position when arcing above an electrical level is detected and to set the selected switches in the closed position when no arcing is detected.

BRIEF DESCRIPTION OF THE DRAWINGS

FIG. 17 is a view similar to the view of FIG. 16 showing the sensory portion of the impact sensor, rupture sensor, moisture sensor, temperature sensor, and arc sensor connected to the evaluation unit of the impact sensor, rupture sensor, moisture sensor, temperature sensor and arc sensor in accordance to the teachings of the invention.

DETAILED DESCRIPTION OF THE INVENTION

Figure 1:
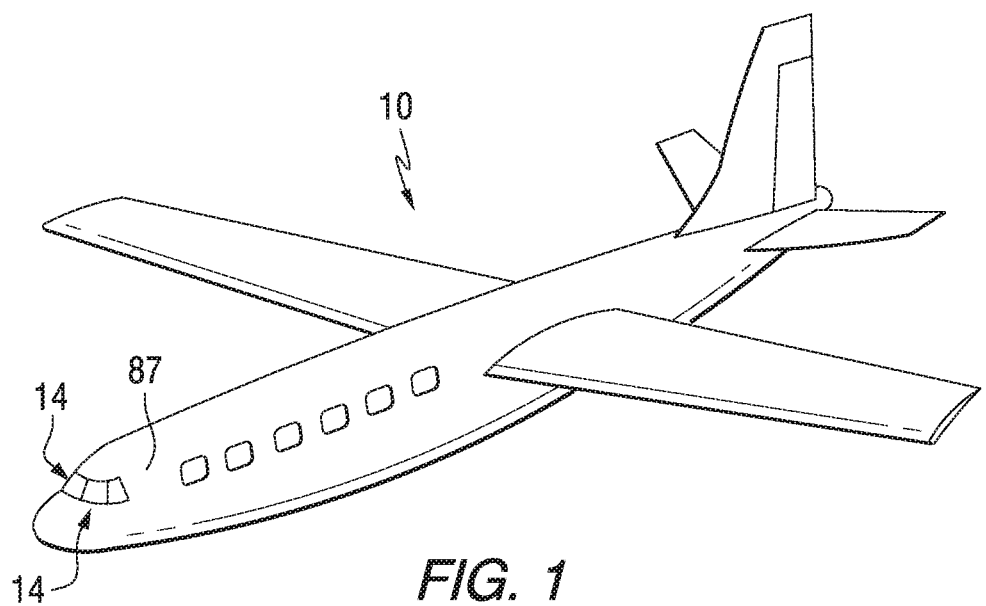
FIG. 1 is an isometric view of an aircraft having non-limiting embodiments of the invention.

As used herein, spatial or directional terms such as "inner", "outer", "left", "right", "up", "down", "horizontal", "vertical", and the like, relate to the invention as it is shown in the drawing on the figures. However, it is to be understood that the invention can assume various alternative orientations and, accordingly, such terms are not to be considered as limiting. Further, all numbers expressing dimensions, physical characteristics, and so forth, used in the specification and claims, are to be understood as being modified in all instances by the term "about." Accordingly, unless indicated to the contrary, the numerical values set forth in the following specification and claims can vary depending upon the property desired and/or sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the term "positioned over" or "mounted over" means positioned on or mounted over but not necessarily in surface contact with. For example, one article or component of an article "mounted over" or positioned over" another article or component of an article does not preclude the presence of materials between the articles, or between components of the article, respectively.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

A non-limiting embodiment of the invention will be directed to an aircraft, e.g., but not limited to the aircraft 10 shown in FIG. 1; and to the transparencies of the aircraft, e.g., but not limited to aircraft windshields 14 having sensors discussed in detail below to provide information regarding the performance of the transparencies and take appropriate action to avoid damage to the aircraft and aircraft components. The invention, however, is not limited to any particular type of sensor, aircraft, and/or aircraft transparency, and the invention can be practiced on any type of aircraft and/or aircraft transparency using any design of sensors to measure performance of the transparency. Further, the invention can be practiced on commercial and residential windows, e.g., but not limited to the type disclosed in U.S. Pat. No. 5,675,944; a window for any type of land vehicle; a canopy, cabin window, and windshield for any type of air and space vehicle, a window for any above or below water vessel, and a window for a viewing side or door for any type of containers, for example but not limited to a refrigerator, cabinet, and/or oven door.

Figure 2:
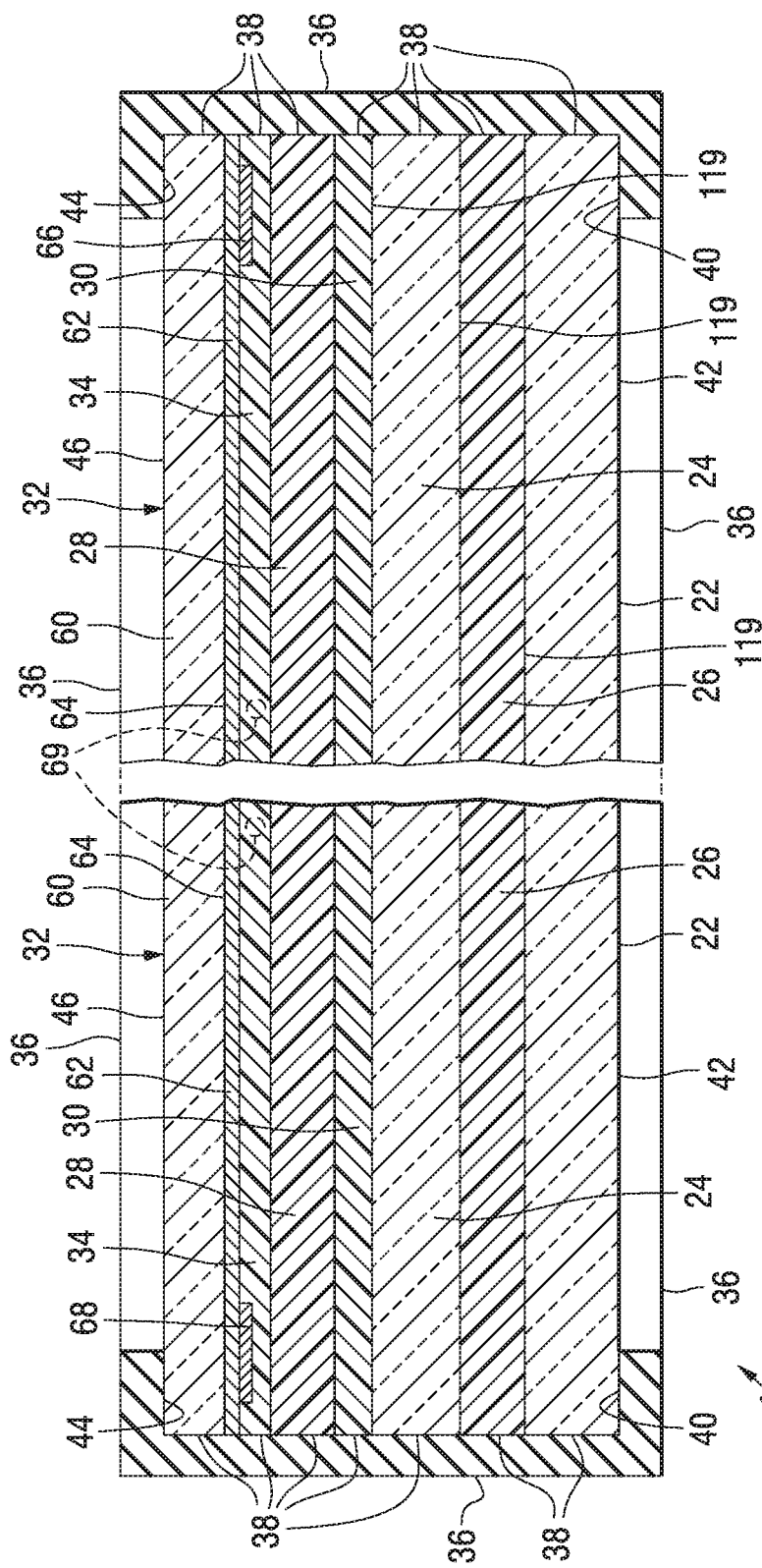
FIG. 2 is a cross-sectional view of an aircraft transparency incorporating features of the invention.

The windshield 14 is preferably a laminated windshield have sensors discussed in detail below and discussed in U.S. Pat. No. 8,383,994. Shown in FIG. 2 is a non-limiting embodiment of the cross section of the aircraft windshield 14 that can be used in the practice of the invention. The windshield 14 includes a first glass sheet 22 secured to a second glass sheet 24 by a first vinyl-interlayer 26; the second sheet 24 secured to a second vinyl-interlayer 28 by a first urethane interlayer 30, and the second vinyl-interlayer 28 secured to a heatable member or heating arrangement 32 by a second urethane interlayer 34.

An edge member or moisture barrier 36 of the type used in the art, e.g., but not limited to a silicone rubber or other flexible, durable, moisture resistant material, is secured to (1) peripheral edge 38 of the windshield 14, i.e., the peripheral edge 38 of the first and second glass sheets 22, 24; of the first and second vinyl-interlayers 26, 28; of the first and second urethane interlayers 30, 34 and of the heatable member 32; (2) margins or marginal edges 40 of inner surface 42 of the windshield 14, i.e., the margins 40 of the outer surface 42 of the first glass sheet 22 of the windshield 14; and (3) margins or marginal edges 44 of outer surface 46 of the windshield 14, i.e., margins of the outer surface 46 of the heatable member 32.

As is appreciated by those skilled in the art and not limiting to the invention, the first and second glass sheets 22, 24; the first and second vinyl-interlayers 26, 28; and the first urethane interlayer 30 form the structural part, or inner segment, of the windshield 14 and the outer surface 42 of the windshield 14 faces the interior of the aircraft 10 (see FIG. 1). The second urethane layer 34 and the heatable member 32 form the non-structural part, or outer segment, of the windshield 14, and the outer surface 46 of the windshield 14 faces the exterior of the aircraft 10. The heatable member 32 provides heat to remove fog from, and/or to melt ice on, the outer surface 46 of the windshield 14 in a manner discussed below.

As can be appreciated, the invention is not limited to the construction of the windshield 14 and any of the constructions of aircraft transparencies used in the art can be used in the practice of the invention. For example and not limited to the invention, the windshield 14 can include a construction wherein the second vinyl-interlayer 28 and the first urethane interlayer 30 are omitted, and/or the glass sheets 22 and 24 are plastic sheets.

Generally, the glass sheets 22 and 24 of the windshield 14 are clear, chemically strengthened glass sheets; however, the invention is not limited thereto, and the glass sheets 22 and 24 can be heat strengthened or heat tempered glass sheets. Further, as is appreciated by those skilled in the art, the invention is not limited to the number of glass sheets 22 and 24, vinyl-interlayers 26 and 28, or urethane interlayers 30 and 34 that make up the windshield 14, and the windshield 14 can have any number of sheets and/or interlayers.

Figure 3:
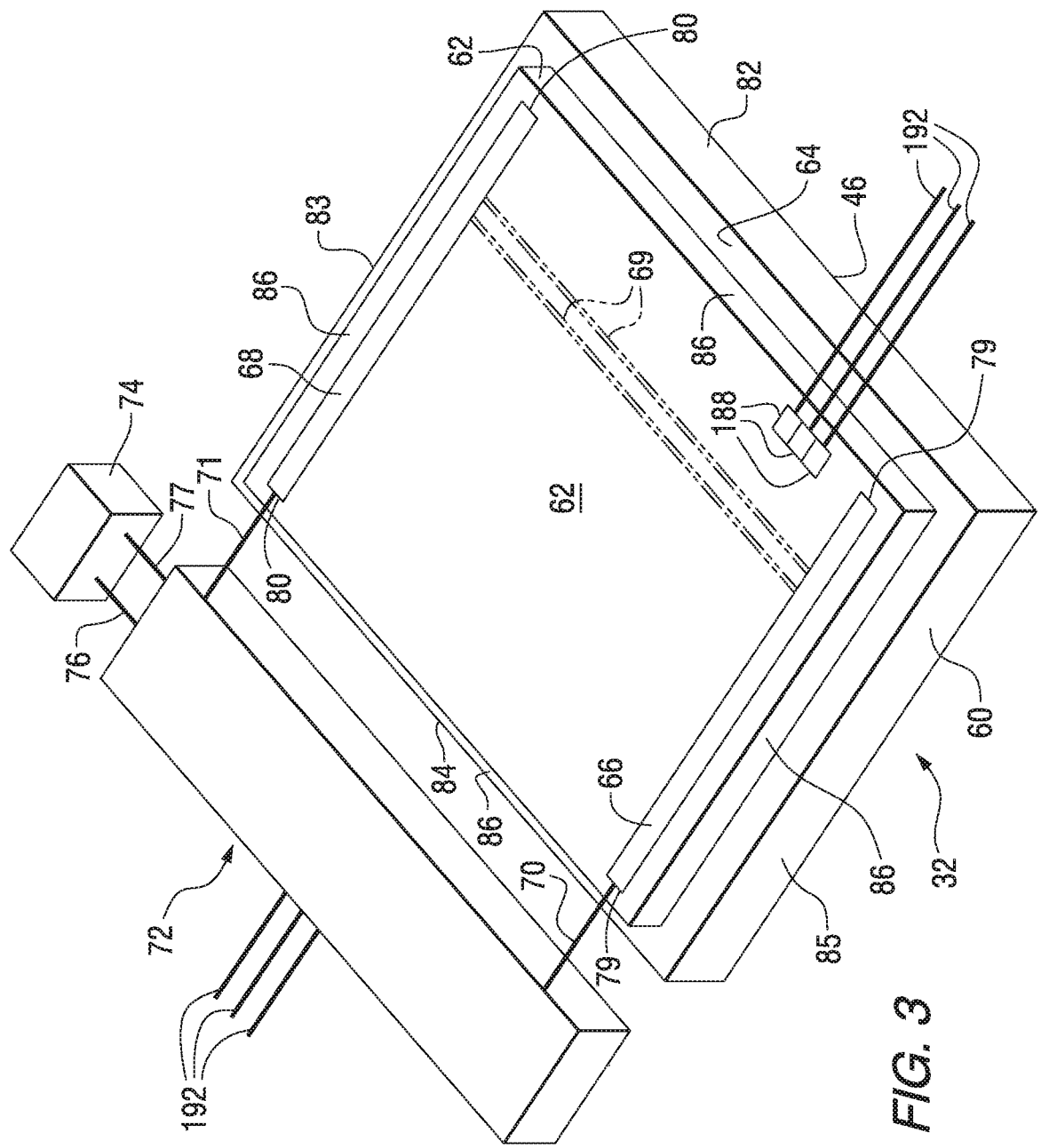
FIG. 3 is an isometric view of a heatable member of the aircraft transparency of FIG. 2 showing in block diagram an electrical system used in the practice of the invention to determine arcing of a heating arrangement.

The invention is not limited to the design and/or construction of the heatable member 32, and any electrical conductive heatable member used in the art to heat a surface of a sheet to prevent the formation of fog, snow, and/or ice on, to melt snow and ice on, and/or to remove fog, snow, and ice from, the outer surface of a windshield, e.g., but not limited to the outer surface 46 of the windshield 14, can be used in the practice of the invention. With reference to FIG. 3, in one non-limiting embodiment of the invention, the heatable member 32 includes a glass sheet 60 (also referred to as a third glass sheet 60) having a conductive coating 62 applied to surface 64 of the third glass sheet 60, and a pair of spaced bus bars 66, 68 in electrical contact with the conductive coating 62. More particularly, the conductive coating 62 is between and in electrical contact with the bus bars 66, 68. The invention is not limited to the composition of the conductive coating 62, and any of the electrical conductive coatings known in the art can be used in the practice of the invention. For example, and not limiting to the invention, the conductive coating 62 can be made from any suitable transparent electrical conductive material. Non-limiting embodiments of transparent conductive coatings 62 that can be used in the practice of the invention include, but are not limited to, a pyrolytic deposited fluorine doped tin oxide film of the type sold by PPG Industries, Inc. under the registered trademark NESA; a magnetron sputter deposited tin doped indium oxide film of the type sold by PPG Industries, Inc. under the registered trademark NESATRON; a coating made up of one or more magnetron sputter deposited films, the films including, but not limited to a metal film, e.g., silver between metal oxide films, e.g., zinc oxide and/or zinc stannate, each of which can be applied sequentially by magnetron sputtering, e.g., as disclosed in, but not limited to, U.S. Pat. Nos. 4,610,771; 4,806,220; and 5,821,001. The disclosures of U.S. Pat. Nos. 4,610,771; 4,806,220; and 5,821,001 in their entirety are hereby incorporated by reference.

The invention is not limited to the use of an electrical conductive coating 62 to heat the third glass sheet 60, and the invention contemplates the use of any type of member that can be electrically heated, e.g., but not limited to electrical conducting wires. The wires, e.g., wires 69 shown in phantom in FIGS. 2 and 3, can be embedded in a sheet of a plastic interlayer, e.g., but not limited to the second urethane interlayer 34 between the bus bars 66 and 68, and electrically connected to the bus bars 66 and 68. Such a heating arrangement is known in the art under the PPG Industries Ohio, Inc. registered trademark AIRCON and is disclosed in U.S. Pat. No. 4,078,107, which patent in its entirety is incorporated herein by reference.

The invention is not limited to the design and/or construction of the bus bars 66 and 68, and any of the types of bus bars used in the art can be used in the practice of the invention. Examples of bus bars that can be used in the practice of the invention include, but are not limited to, the types disclosed in U.S. Pat. Nos. 3,762,902; 4,623,389; and 4,902,875, which patents in their entirety are hereby incorporated by reference.

With continued reference to FIG. 3, in one non-limiting embodiment of the invention, each of the bus bars 66 and 68 are connected by a wire 70 and 71, respectively, to an intelligent electrical power controller and monitoring system 72 (discussed in more detail below), and the controller and monitoring system 72 is connected to aircraft electrical power supply 74 by wires or electric cables 76 and 77. Although not limiting to the invention, ends 79 of the bus bar 66, and ends 80 of the bus bar 68 are spaced from adjacent sides 82-85 of the glass sheet 60, and sides 86 of the coating 62 are spaced from the sides 82-85 of the glass sheet 60, to prevent arcing of the bus bars 66 and 68, and the coating 62 with metal body cover 87 of the aircraft 10 (see FIG. 1).

In a non-limiting embodiment of the invention, the windshield 14 is provided with one or more sensors to monitor the performance of selected components and/or properties of the windshield 14. In this aspect of the invention, the sensors include, but are not limited to: an impact sensor; a rupture sensor; a moisture sensor; a conductive coating temperature sensor; and an arc sensor.

As discussed above and repeated here for purposes of appreciating the invention, the sensors operating on an article or component, e.g., but not limited to the heatable member 32 of the windshield 14, are considered to include two sub-operating systems. For purposes of clarity, one component or sub-operating system of the sensor is referred to as the "sensory portion" of the sensor, and the second component or second sub-operating system is referred to as the "evaluation unit" of the sensor. The sensory portion is used as a feed back to the evaluation unit to trigger the control actions on a component or article of the aircraft, e.g., but not limited to the heatable member 32 of the windshield 14, to, among other things, increase or decrease the heat of the heatable member 32 through the supplied electrical current to the heatable member 32. For example, the windshield temperature sensors (discussed in detail below) are used to monitor the heatable member 32 effected by the changes to the article or component under observation, e.g., but not limited to heating the heatable member 32 of a windshield 14 to remove snow, ice, and/or fog from the outer surface 36 of the windshield 14, and the sensory portion forwards a signal, usually, but not limited to an electric signal, to the evaluation unit to trigger a control action on the amount of heat (electrical current) applied to the heatable member of the windshield.

The evaluation unit acts on the signal from the sensory portion to measure the properties of the article, e.g., but not limited to the temperature of the heatable member, as an indication of actual performance and/or potential windshield failures and/or as an indication for a preventive maintenance for the windshield article or component, e.g., but not limited to the heatable member of the windshield. In one aspect of the invention, the signals from the evaluation unit is forwarded to an electronic storage (electric storage 266, FIG. 14, discussed in more detail below) to compile a history of the performance of the article being monitored, e.g., but not limited to the windshield of the aircraft.

In another non-limiting aspect of the invention, the sensors are considered to be "activating sensors" or "non-activating sensors." "Activating sensors" are sensors in which the evaluation unit is triggered to take action when the article or component, e.g., but not limited to the heatable member of the windshield, forwards a signal indicating that the heatable member is operating outside of acceptable limits. The action can include, but is not limited to, the evaluation unit acting on the article or component to separate the article or component from the power supply and/or modifying the power input to the article or component, to change the operating performance of the article or component being monitored. By way of illustration and not limiting to the invention, an arc sensor monitors the performance of the heatable member 32. When the evaluation unit determines electric arcing is occurring, a signal is forwarded to the electronic storage (electric storage 266, FIG. 14, discussed in more detail below) and to a power supply switch (198, FIG. 13) to electrically separate the heatable member and the current supply to stop heating the outer surface of the windshield. "Non-activating sensors" are sensors in which the sensory portion forwards a signal, e.g., but not limited to an electric signal to the electronic storage and to a display (housing 400, FIG. 18, discussed in more detail below) to advise responsible personnel that the component being monitored is operating inside or outside of acceptable limits. By way of illustration and not limiting to the invention, a moisture sensor monitors moisture moving between the interlayers of the laminated windshield. When the signal from the evaluation unit of the moisture sensor indicates undesirable levels of moisture, no action is taken. Instead, responsible personnel are advised to take action, where the action taken can include, but is not limited to, schedule the windshield for replacement and/or repair. In another non-limiting example of the invention, an impact sensor monitors impacts to the windshields. When the signal from the evaluation unit of the impact sensor indicates undesirable levels or numbers of impacts, the windshield is examined after the aircraft has landed to determine if the windshield is structurally useable.

More particularly, when the signal from the evaluation unit acts to inform those who have a need to know, e.g., but not limited to the operators of the aircraft, that a component is operating outside of acceptable limits, but does not act to shut down or limit the operation of the component, the sensor is acting as a non-activating sensor. When the signal from the evaluation unit acts to shut down or limit the operation of the component, and optionally inform those that have a need to know, e.g., but not limited to the operators of the aircraft, that the component is operating outside of acceptable limits, the sensor is acting as an activating sensor.

The discussion is now directed to the operation of selected sensors usually found on a windshield of an aircraft for a better appreciation and understanding of (1) the sensory portion, and the evaluation unit; (2) the use of the sensor as a "non-activating sensor" and/or as an "activating sensor"; and (3) the positioning of the evaluation unit in a location other than the component having the sensory portion. The sensors discussed below include, but are not limited to, an impact sensor, a rupture sensor, a moisture sensor, an arc sensor, and a conductive coating temperature sensor. A discussion of the sensors is presented in the non-limited aspects of the invention discussed below, and a detailed discussion is found in U.S. Pat. Nos. 8,155,816; 8,383,994; 8,981,265; and 9,166,400. As can be appreciated, the invention is not limited to the sensors discussed below, and the invention can be practiced with any type of sensor, e.g., but not limited to stress sensor, p-static sensor.

Impact Sensor

Figure 4:
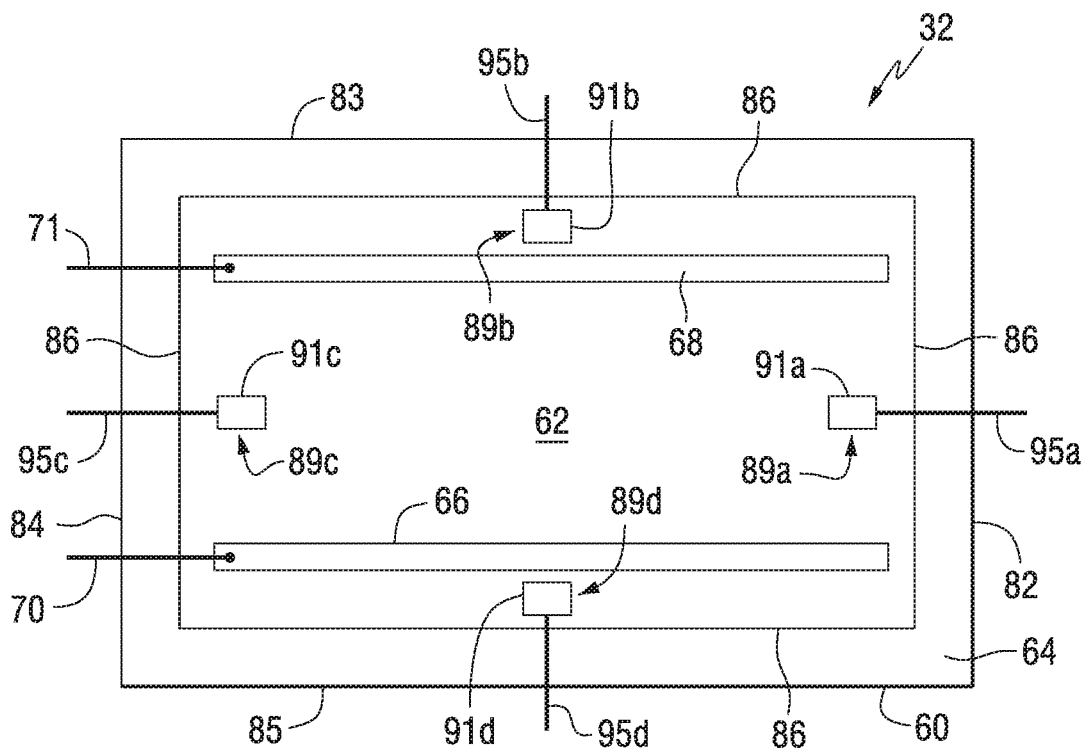
FIG. 4 is a plan view of a non-limiting aspect of a sensory portion of an impact sensor or detector positioned on the electrically conductive member of a heating arrangement in accordance to the teachings of the invention.

As can be appreciated, the invention is not limited to the design or construction of the impact sensor and any impact sensor used in the art can be used in the practice of this invention. In one non-limiting aspect of the invention, the heatable member 32 of the windshield 14, as shown in FIG. 4, is provided with four impact sensors or detectors 89*a*-89*d*. Each of the four impact sensors 89*a*-89*d* includes a sensory portion 91*a*-91*d* (see FIG. 4) and an evaluation unit 93*a*-93*d* (see FIG. 5), respectively. The sensory portion 91*a*-91*d* of the impact sensors 89*a*-89*d*, respectively, are mounted on a sheet of the windshield 14. In FIG. 4 the sensory portion 91*a*-91*d* of the sensors 89*a*-89*d* are mounted on or over the surface 64 of the sheet 60 of the heatable member 32 and, more particularly, but not limiting to, the invention on the conductive coating 62 of the heatable member 32. The sensors 89*a*-89*d* indicate that one or more foreign objects have hit the outer surface 46 of the windshield 14 and of the heatable member 32 (see FIG. 3), and optionally the sensors 89*a*-89*d* report the location on the outer surface 46 where the hit or impact occurred and the relative energy of the impact on the surface 46 of the windshield 20.

The sensory portion 91*a*-91*d* of each of the impact sensors 89*a*-89*d* includes a piezoelectric crystal. When the piezoelectric crystal is exposed to vibration, e.g., vibration of the glass sheet 60 (see FIGS. 1 and 2) caused by a stone hitting the outer surface 46 of the glass sheet 60, the piezoelectric crystal undergoes a compression or distortion and, as a result, produces an electric field, which can be used to activate or to cause an alarm and/or a recorder to be activated to announce and/or record the hit or impact.

Figure 5:
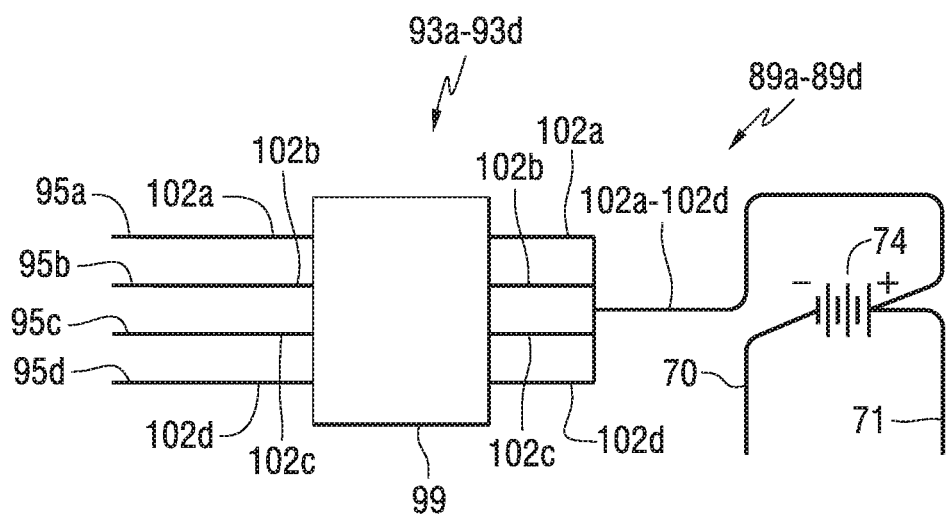
FIG. 5 is a non-limiting aspect of an electrical system of the evaluation unit or performance measuring portion of the impact sensors to measure performance of the sensory portion of the impact sensor in accordance to the teachings of the invention, the sensory portion of the impact sensor shown in FIG. 4.

With continued reference to FIGS. 4 and 5, the sensory portion 91*a*-91*d* of the impact sensors 89*a*-89*d* are in electrical contact with ones of piezoelectric crystals by a connection 95a-95d. Each of the impact sensors 89a-89d are electrically connected to data processing equipment 99 and the power supply 74 by way of wires 102a-102d, respectively (see FIG. 5). In this manner, the power to the impact sensors 89a-89d is provided by the power supply 74, and changes in the electric field of each of the impact sensors 89a-89d measured or monitored by the data processing equipment 99. As can be appreciated, the invention is not limited to the manner in which electric power is provided to the impact sensors 89a-89d and any circuit arrangement can be used in the practice of the invention. As can be appreciated, the power input to the impact sensors can be a power input to the evaluation unit of the sensor and the power supply can be alternating or direct current.

In one non-limiting aspect of the invention, the data processing equipment 99 is software which analyzes the signal forwarded along wires 97a-97d and 102a-102d to determine the location of the impact by triangulation of the signals from selected ones or all of the sensors 89a-89d, and the magnitude of the impact, e.g., by the magnitude of the electric field, and stores the information. Electronic circuitry for use of impact detectors, e.g., piezoelectric crystal is well known in the art, e.g., see U.S. Pat. No. 6,535,126, which patent in its entirety is hereby incorporated by reference, and no further discussion is deemed necessary.

As can be appreciated, the invention can be practiced with more or less than four impact sensors 89a-89d. More particular, increasing the number of impact sensors, e.g., using 5, 6, 7, 10, or 20 impact sensors increases the accuracy of locating the impact area and the force with which the windshield was impacted, and using less than 4, e.g., 1, 2, or 3 sensors, decreases the accuracy of locating the impact area and the force with which the windshield was impacted.

The sensory portion 91a-91d of the impact sensors 89a-89d, respectively, discussed above includes the piezoelectric crystal (identified by numbers 91a-91d in FIG. 4), and the evaluation unit 93a-93d of the impact sensors 89a-89d includes the data processing equipment 99 and electrical connectors, e.g., but not limited to wires connecting the electrical components of the sensory portion 93a-93d of the impact sensors 89a-89d.

As can be appreciated, the piezoelectric crystal is not powered by electric current; however, it is noted that electrical power is required to operate the evaluation unit. The electric power supply for the evaluation unit of the impact sensors 89a-89d shown in FIG. 5 is the electric power supply 74 for powering the aircraft 10, however, as can be appreciated, the evaluation unit or the performance measuring portion of the impact sensors can each be powered by a dedicated power source.

Rupture Sensor

Figure 6:
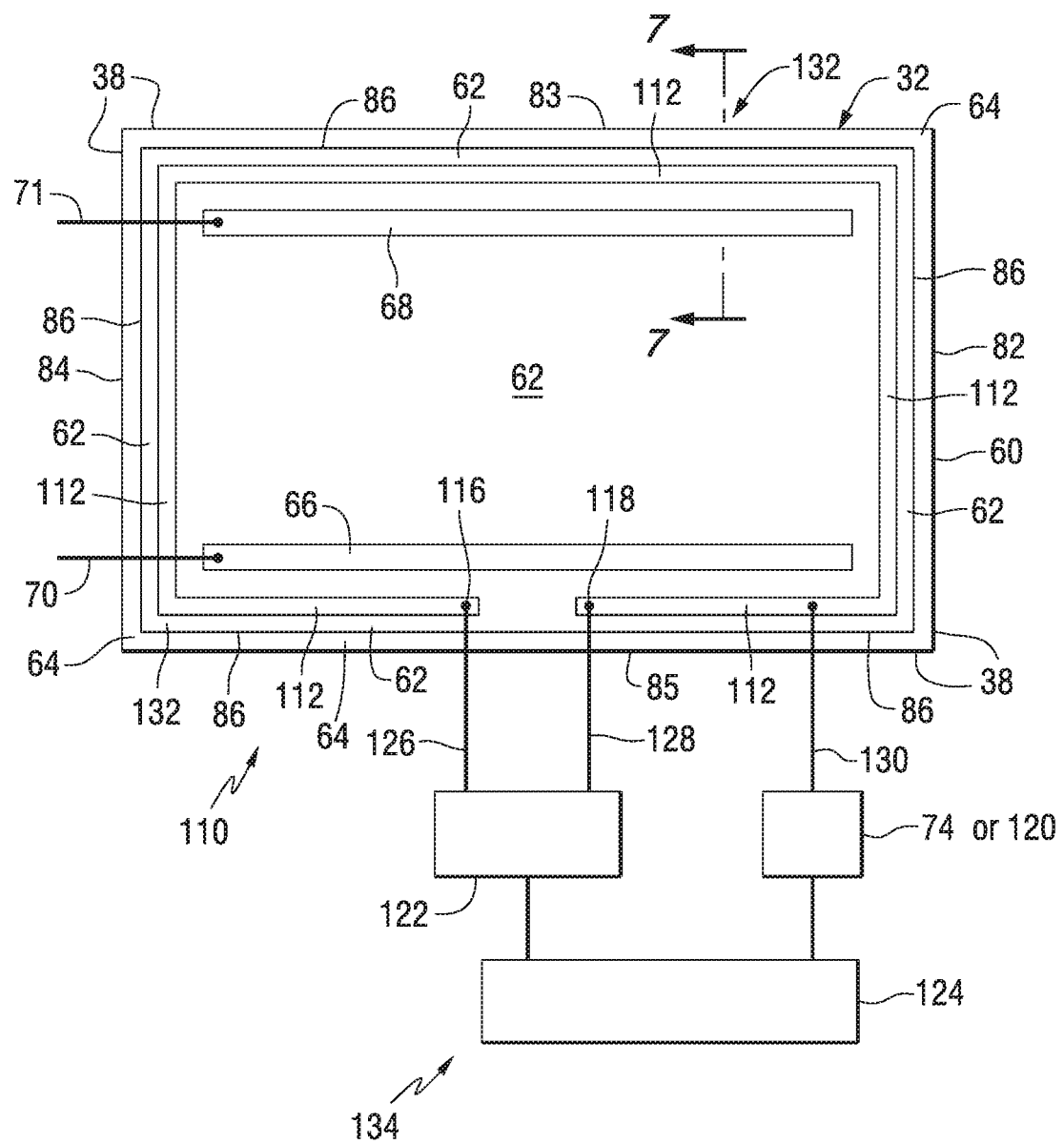
FIG. 6 is a schematic view of a non-limiting aspect of a rupture sensor or detector of the invention.
Figure 7:
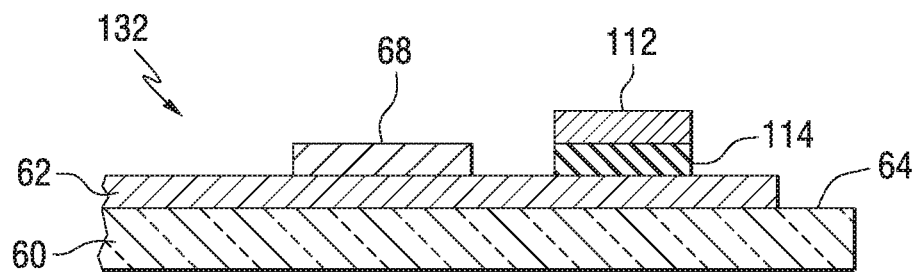
FIG. 7 is a view taken along lines 7-7 of FIG. 6.
Figure 8:
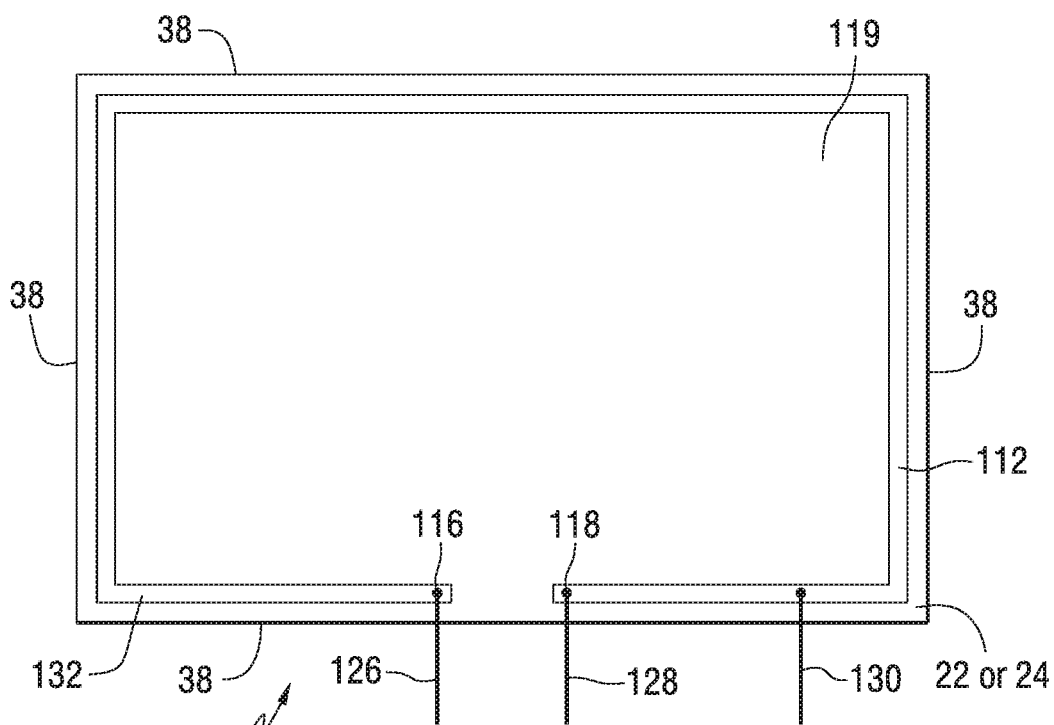
FIG. 8 is a schematic view of another non-limiting aspect of a sensory portion of a rupture sensor or detector used in the practice of the invention.

In the following discussion, an aspect of the rupture or crack detector, or sensor disclosed in U.S. Pat. No. 8,383,994, is used in the practice of the invention, however, as is appreciated, the invention is not limited thereto and any of the crack sensors or detectors known in the art can be used in the practice of the invention. A non-limiting aspect of a rupture sensor of the type disclosed in U.S. Pat. No. 8,383,994 is shown in FIGS. 6-8 and designated by the numbers 110 (FIG. 6) and 111 (FIG. 8). The rupture sensor 110 (FIG. 6) includes an electrically conductive strip 112 extending along or around substantially the entire outer periphery 38 (see FIGS. 2, 6 and 8) of the major surface 64 of the sheet 60 of the heatable member 62 (see FIG. 6) and/or one of the sheets 22, 24 (see FIG. 8) of the windshield 14. In FIGS. 6 and 7, the conductive strip 112 is shown mounted over or in surface contact with the electrically conductive coating 62 and over or in surface contact with the surface 64 of the glass sheet 60, surrounds the bus bars 66 and 68, and is electrically isolated from the conductive coating 62 and the bus bars 66 and 68 by an electrically insulating layer 114, e.g., a urethane layer or an electrically non-conductive coating layer (see FIG. 7).

The conductive strip 112 is mounted over the conductive coating 62 spaced from the sides 82-85 of the sheet 60, as shown in FIG. 6. The conductive strip 112 has a first termination surface 116 and a second termination surface 118. The distance or gap between the first termination surface 116 and the second termination surface 118 is sufficient to prevent any descriptive electrical field communication between the termination surfaces 116 and 118. As can be appreciated, the conductive strip 112 can decrease visibility through that portion of the glass sheet over which it is deposited and, therefore, the maximum width of the conductive strip 112 depends upon the required or specified operator viewing area through the windshield 14.

As can be appreciated, the conductive strip 112 can be applied to any surface of any one or all of the sheets of the laminated windshield 14. More particularly, and as shown in FIG. 8, the conductive strip 112 is secured on a surface 119 of the sheet 22 and/or 24 spaced from the outer periphery 38 of the sheet 22 and/or 24, and the terminal surfaces 116 and 118 spaced from one another, as shown in FIG. 8.

The rupture sensor 110 further includes an electrical power source. The power source can be the main power source 74 dedicated to providing electrical power to associated equipment and electronic devices of the aircraft 10 or a dedicated electrical power source identified by the number 120 (see FIG. 6) dedicated to powering the electrical components, e.g., but not limited to the conductive strip 112. The dedicated power source 120 can be any conventional electrical source, such as, but not limited to, a battery, an electric generator, and the like. Further, the rupture sensor 110 includes an electrical measurement mechanism 122, such as an ohmmeter, in communication with the conductive strip 112 for measuring the electrical condition of the conductive strip 112. A control mechanism 124, such as software and a computer, is used to control and communicate with both the electrical power source 74 and/or 120 and the electrical measurement mechanism 122. This control mechanism 124 can be used to command the electrical power source 74 and/or 120 to provide a predetermined or specifically set electrical current to the conductive strip 112 and, after application, the control mechanism 124 can collect and/or calculate the electrical potential of the conductive strip 112 via the electrical measurement mechanism 124.

In an alternative implementation, the electrical power source 74 and/or 120 applies a set voltage to the conductive strip 112, as set or specified by the control mechanism 124. This set voltage allows current to flow through the conductive strip 112. The electrical measurement mechanism 122 is connected to the conductive strip 112 through a first lead 126 and a second lead 128. The first lead 126 is connected to the first termination surface 116, and the second lead 128 is connected to the second termination surface 118. This connection allows the conductive strip 112 to act as an electrical circuit when the electrical power source 74 and/or 120 applies an electrical potential.

The electrical measurement mechanism 122 reads or measures the current flowing through the conductive strip. Since the electrical power source 74 or 120 is applying a set voltage to the conductive strip 112 along lead 130, and the electrical measurement mechanism 122 is reading or measuring the current flowing through the conductive strip 112, the electrical measurement mechanism 122 (or the control mechanism 124) is able to calculate the resistance value of the conductive strip 112.

When a rupture or crack occurs and propagates in the glass sheet 22, 24, and/or 60, it will eventually reach the conductive strip 112. As the crack begins to move through and break a section of the conductive strip 112, the resistance value calculated by either the electrical measurement mechanism 122 or the control mechanism 124 begins to increase. This resistance value increase indicates a rupture or crack in the glass sheet and the conductive strip 112, e.g., but not limited to the glass sheet 22, 24, and/or 60. When the crack fully traverses and breaks the conductive strip 112, the resistance value reaches infinity and indicates a serious rupture condition.

The conductive strip 112 can be a conductive coating material formed from any suitable electrically conductive material, such as a metal, metal oxide, a semi-metal, an alloy, or other composite material. The conductive strip 112 can also be opaque or transparent. Further, the conductive strip 112 can be a conductive coating material formed from a ceramic paint or electrically conductive ink. The conductive material is preferably a material that will crack or separate when the glass sheet cracks or otherwise change its electrical properties in a manner that allows for detection of an electrical change. The conductive strip 112 can be deposited on a surface of one or more of the glass sheets 22, 24, and 60 through conventional thin film deposit methods or conventional thick film deposit methods; conventional adhesion manufacturing methods; screening, or other similar process. In one embodiment, the conductive strip 112 is a conductive indium tin oxide coating.

The invention contemplates a system where the evaluation unit 134 is located separate from article being monitored. The sensory portion 132 of the rupture sensors 110 and 111 include the conductive strip 112, and the evaluation unit 134 of the rupture sensors 110 and 111 include the electrical measurement mechanism 122 and the control mechanism 124. The sensory portion could be implemented by applying a conductive strip 112 on more than one sheet, e.g., but not limiting to the invention, applying a conductive strip 112 on a surface of the glass sheets 22, 24, and 60. As is appreciated, when a conductive strip 112 is placed on more than one sheet, each one of the conductive strips 112 has its own electrical power source 120, or one power source 74 is provided and is electrically connected to two or more of the conductive strips 112, and a rheostat is provided for each conductive strip 112 for controlling voltage to each of the conductive strips 112 in a manner discussed above. In an alternative embodiment of the invention, the sensory portion of the rupture sensor could be an optical measurement system mounted separate from the windshield being monitored with the evaluation unit mounted separate from the windshield but electrically connected to the sensory portion.

Moisture Sensor

As discussed above and as shown in FIG. 2, the windshield or transparency 14 has an outboard moisture seal or barrier 36 to prevent moisture from entering between the glass sheets 22, 24, and 60, and the plastic interlayers or sheets 26, 28, 30, and 34 of the windshield 14. More particularly, when the moisture seal or barrier 36 fails, e.g., cracks or de-bonds due to erosion caused by wind and rain, moisture enters between the sheets and/or interlayers of the windshield 14. When moisture moves between the sheets and/or interlayers, the windshield 14 can de-laminate and/or the heatable member 32 can be damaged and fail, ending the service life of the windshield. When de-lamination of the windshield 14 occurs, the rate and amount of moisture entering between the sheets and/or interlayers increases, accelerating the degradation of the windshield 14.

Figure 9:
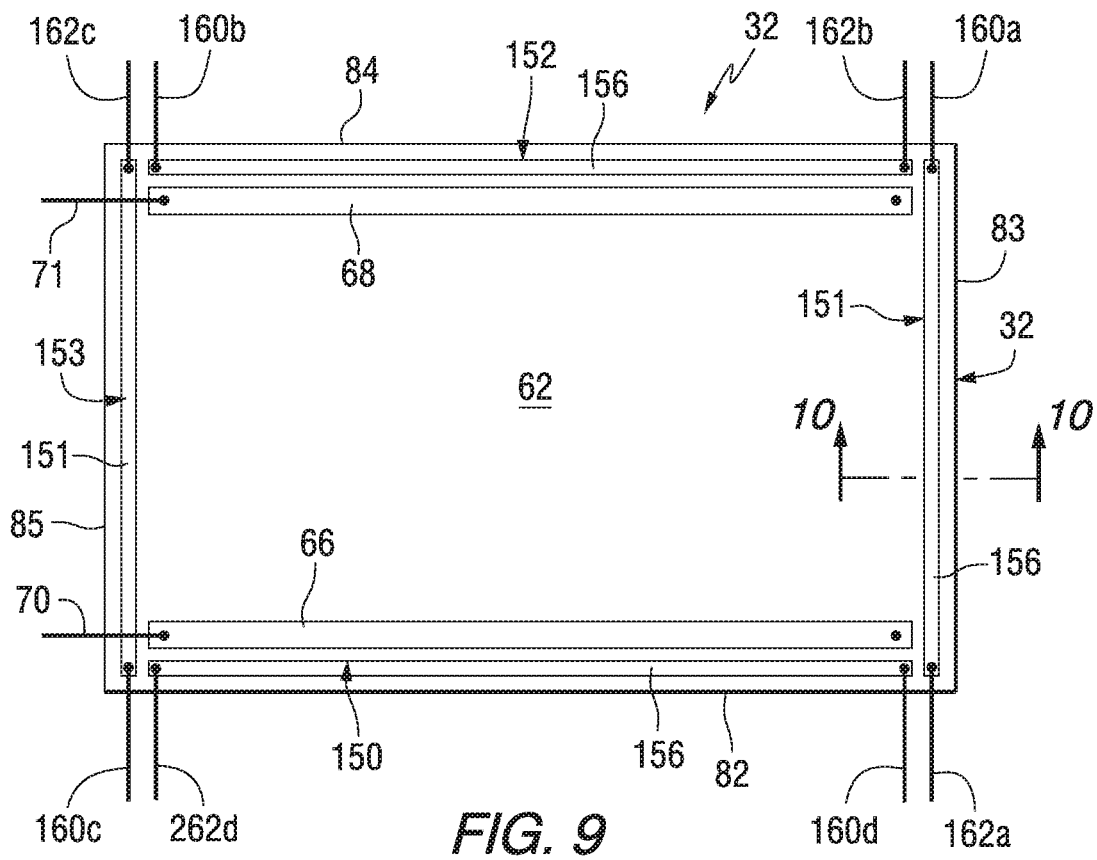
FIG. 9 is a plan view of a non-limiting aspect of a sensory portion of a moisture sensor or detector positioned over the electrically conductive member of a heating arrangement in accordance to the teachings of the invention.
Figure 10:
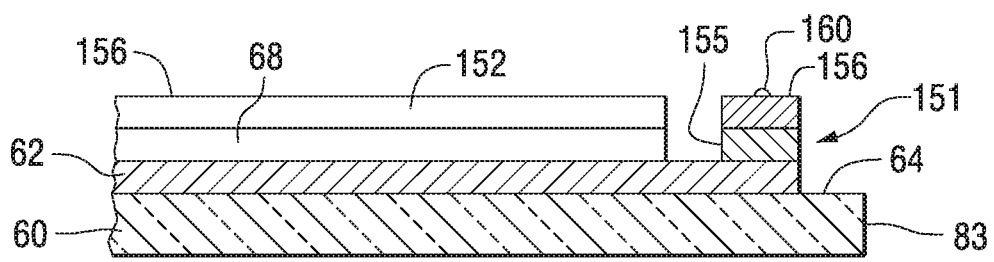
FIG. 10 is a view taken along lines 10-10 of FIG. 9.
Figure 11:
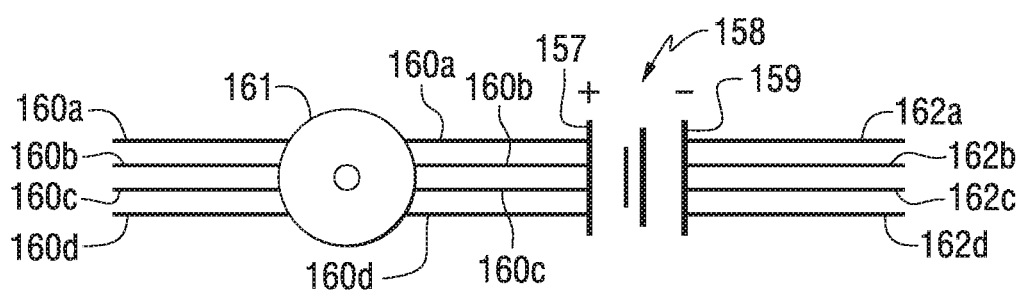
FIG. 11 is a non-limiting aspect of an electrical system of the invention to monitor and act on output signals of the sensory portion of the moisture sensors shown in FIG. 9 in accordance to the teachings of the invention.

With reference to FIG. 9 as needed, the heatable member 32 has moisture sensors 150-153 positioned on the conductive coating 62 adjacent sides 82-85, respectively of the sheet 60. As clearly shown in FIG. 10, in one non-limiting embodiment of the invention, each of the sensors 150-153 include a layer 155 of a moisture sensitive material (hereinafter also referred to as "moisture sensitive layer") deposited on the conductive coating 62, and an electrically conductive layer 156 deposited on or over the moisture sensitive layer 155. Each of the conductive layers 156 of each of the sensors 150-153, as shown in FIG. 11, are individually connected to a positive pole 157 of a power source 158 by way of a wire 160a-160d, respectively. Optionally, the wires 160a-160d are individually connected to the positive pole 157 of the power source 158 through a rheostat or variable transformer 161 to regulate the power input to each of the conductive layers 156 of the sensors 150-153.

The invention is not limited to the material of the moisture sensitive layer 155 and any moisture sensitive material can be used in the practice of the invention, e.g., but not limited to titanium dioxide, and/or the materials disclosed in U.S. Pat. Nos. 4,621,249 and 4,793,175, the disclosures in their entirety are hereby incorporated by reference. Further, the invention is not limited to the material of the electrically conductive layer 156 on or over the moisture sensitive layer 155 and any electrically conductive material, e.g., but not limited to aluminum, copper, gold, and silver, can be used. In one non limiting aspect of the invention, a moisture sensitive layer 155 includes sputtered titanium dioxide film, and an electrically conductive layer 156 includes sputtered gold.

Figure 12:
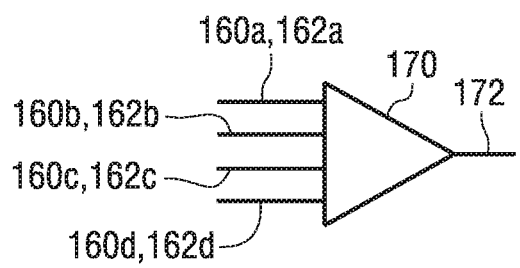
FIG. 12 is a non-limiting aspect of an electrical system of the performance measurement portion of the moisture sensors shown in FIG. 9 in accordance to the teachings of the invention.

As the moisture sensitive layer 155 absorbs moisture, the impedance of the moisture sensitive layer 155 changes. As can be appreciated, the impedance of the moisture sensitive layers 155 can be measured and/or monitored in any usual manner. In one non-limiting aspect of the invention, wires 162a-162d interconnect the negative pole (−) 159 of the power source 158 and the ends of the conductive layers 156 of the sensors 150-153, respectively. The voltage difference between each pair of wires 160a and 162a, 160b and 162b, 160c and 162c, 160d and 162d is measured and/or monitored by comparator 170 (see FIG. 12). With reference to FIGS. 11 and 12, the wire 160a-160d of each of the sensors 150-153 is connected to comparator 170. The comparator 170 monitors the impedance of the moisture sensitive layer 155 of each one of the moisture sensors 150-153. When the impedance change exceeds a predetermined amount, a signal is forwarded along wire 172 to an alarm and/or monitor discussed below.

In the non-limiting aspect of the invention shown in FIGS. 9-12, the positive pole (+) 157 of the power source 158 (see FIG. 11) is connected to the conductive layer 156 of each of the moisture sensors 150-153 by wire 160a-160d, respectively, and the negative pole (−) 159 of the power source 158 is connected to the conductive layer 156 of each of the sensors 150-153 by wires 162a-162d, respectively (See FIG. 9).

With the arrangement discussed above, the sensory portion of the moisture sensors 150-153 includes the moisture sensitive layer 155 and the electrically conductive layer 156, and the evaluation unit of the moisture sensors 150-153 includes the transformer 161 (see FIG. 11) and the comparator 170 (FIG. 12). The output of the comparator 170 along the wire 172 provides the information as to the performance of the moisture barrier 36 of the windshield 14. In another non-limiting embodiment of the invention, the evaluation unit can consist of a frequency based impedance sensor and software monitoring the impedance of the sensor. Again, the invention is a system wherein when the sensing portion of a moisture sensor is included within the windshield, the evaluation unit can be placed separate from the windshield and electrically monitor the status of the moisture sensor. In another non-limiting embodiment of the invention, the sensory portion of the moisture sensor may be a remote, non-contact device (such as one using infra-red transmission) which may also be physically mounted separately from the windshield while still being electrically connected to the evaluation unit separate from the windshield.

As can now be appreciated, the impact sensor, the rupture sensor, and the moisture sensor discussed above are designed to operate as non-activating sensors (discussed above) because they measure performance of an article to determine if the article is within acceptable limits and do not automatically take action to alter performance of the article when the article is performing outside of acceptable limits.

ARC Sensor and Conductive Coating Temperature Sensor

The discussion is now directed to an arc sensor and a conductive coating temperature sensor to monitor the performance of the heatable member 32 and take corrective action when the heatable member operates outside of acceptable limits. More particularly, the arc sensor 72 monitors the performance of the heatable member 32 to determine if there are occurrences of major arcing and minor arcing associated with the operation of the heatable member 32. The conductive coating temperature sensor 190 monitors the temperature of the heatable member and when the temperature of the heatable member 32 exceeds a given temperature, switches are activated to disconnect the heatable member from its electric power source. The arc sensor 72 and the temperature sensor 190 are considered together because the electrical circuit for the arc sensor and the electrical circuit for the coating temperature sensor usually operate in conjunction with one another as described below, however, as can be appreciated, the invention contemplates the arc sensor and conductive coating temperature sensor having electric circuits independent of one another.

In the preferred embodiment of the invention, the arc detection system is separate from the windshield and included within another avionic unit (such as the heater controller). In this case, both the sensory portion and the evaluation unit are included within the heater controller. In another non-limiting embodiment of the invention, the evaluation unit is included within the heater controller but the sensory portion is separate, included within the windshield itself or anywhere along the electrical connection between the windshield and the heater controller, still being electrically connected to the evaluation unit.

Figure 13:
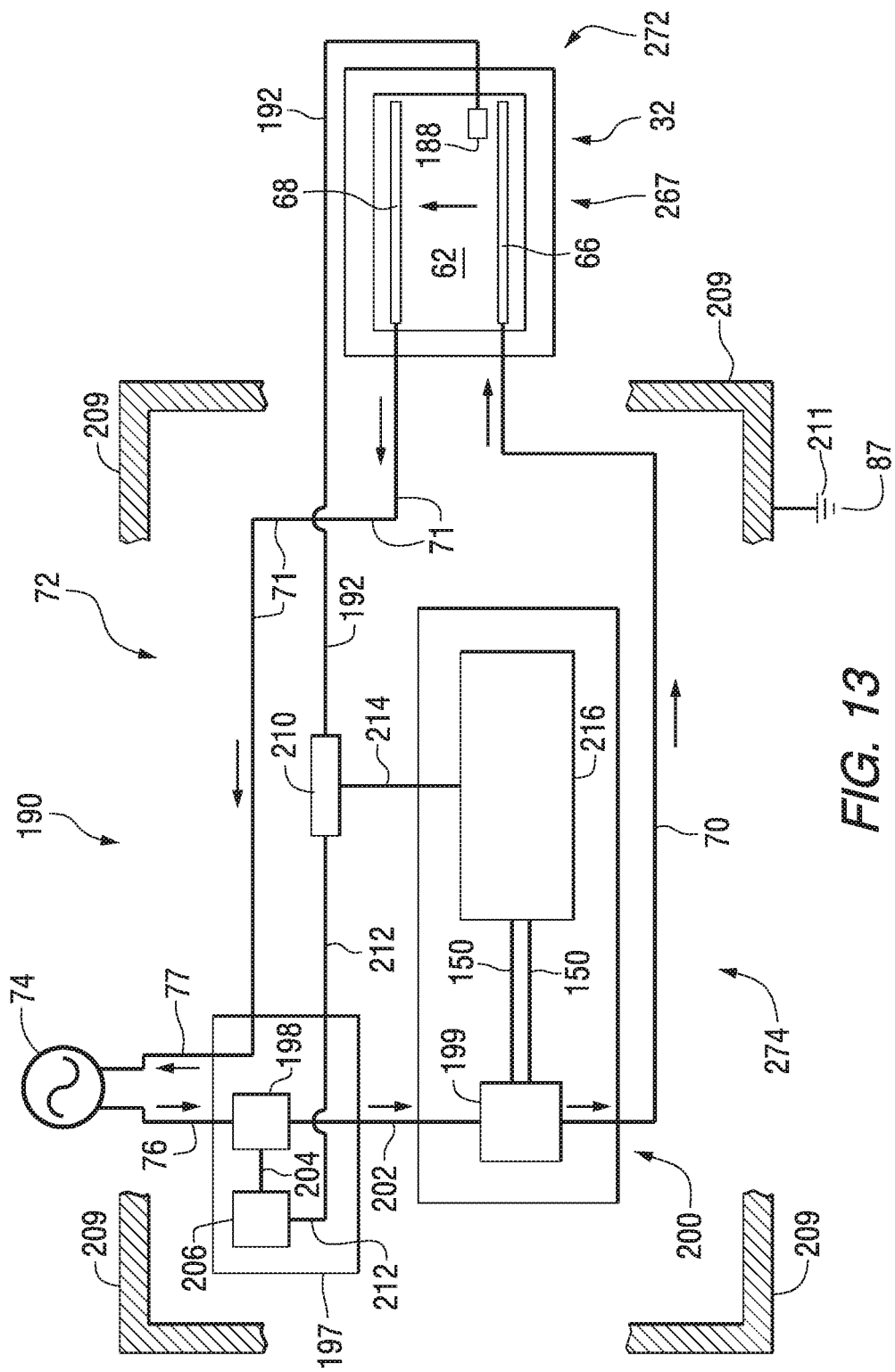
FIG. 13 is a block diagram of a non-limiting aspect of an intelligent electrical power controller and monitoring system of the invention connecting an electrical power supply of the aircraft to the heating arrangement of the type shown in FIG. 3.

With reference to FIGS. 3 and 13 as needed, temperature sensor 190 includes thermistors 188 mounted on the conductive coating 62 to sense the temperature of the conductive coating 62 of the heatable member 32, and are connected to the intelligent electrical power controller and monitoring system or arc sensor 72 by a wire or electric cable 192 in a manner discussed below. The invention is not limited to the temperature sensors 188, and any of the types used in the art can be used in the practice of the invention. Further, the invention is not limited to the number of temperature sensors 188 mounted on the coating 62, and any number of sensors, e.g., one, two, or three sensors, can be mounted on the coating 62 to sense the temperature of different areas of the coating 62.

It should be noted that FIG. 3 shows three wires 192 for the three temperature sensors 188, whereas in FIG. 13 the three temperature sensors and the three wires 192 are bundled and shown as one sensor 188 and one wire 192 for purposes of clarity and ease of following the path of the wires 192.

With reference to FIG. 13, in one non-limiting aspect of the invention, the aircraft power supply 74 supplies alternating electric current along the wires 76 and 77 to a window heat controller 197 of the intelligent electrical power controller and monitoring system or arc sensor 72. As is appreciated by those skilled in the art, the invention is not limited to the power supply 74 and the power supply 74 can be an alternating current supply as shown in FIG. 13 or a direct current supply as is known in the art and shown in FIG. 5. The wire 76 of the power supply 74 is connected to one pole of a switch 198 of the window heat controller 197, and the other pole of the switch 198 is connected to current transformer 199 of an arc monitoring and detecting system 200 of the invention by a wire or electric cable 202. The switch 198 is usually in the closed position and is moved from the closed position to the open position and vice versa by signals forwarded along wire or electric cable 204 from a control logic for a heat controller 206 of the window heat control 197. The current transformer 199 is connected to the bus bar 66 of the heatable member 32 by the wire 70. The bus bar 68 of the heatable member 32 is connected to the power supply 74 by the wires 71 and 77.

In one non-limiting aspect of the invention, components of the intelligent electrical power controller and monitoring system or arc sensor 72 are mounted in a Faraday box 209, and the Faraday box 209 is connected to ground, e.g., the body 87 of the aircraft 10 (see FIG. 1) by the wire or cable 211 (see FIG. 13) to block out external static electric fields.

With continued reference to FIG. 13, the temperature sensor 188 is connected to one connector of an electronic switch 210 by the wire 192, and a second connector of the switch 210 is connected by wire 212 to the control logic 206 of the window heat controller 197. The switch 210 is usually in the closed position and is moved from the closed position to the open position, and from the open position to the closed position, by signals forwarded to the switch 210 along wire or electric cable 214 from a signal filtering and modifying system 216 of the arc monitoring and detecting system 200.

The evaluation unit 216 of the arc sensor 72 provides a signal to switch 210 for electrically disconnecting the heating arrangement 32 and the power supply 74 from one another when any of the following conditions are detected: (a) the temperature of the heatable member 32 is greater than a predetermined temperature; or (b) major arcing.

Consider now Condition (a): the temperature of the heatable member 32 is greater than a predetermined temperature. With reference to FIG. 13, the switch 198 of the heat controller 197 and the switch 210 are each in the closed position to heat the heatable member 32 to remove fog, snow, and/or ice from the outer surface 46 of the windshield 14 (see FIG. 2). The temperature of the heatable member 32 is sensed by the temperature sensor 188 and the signal of the temperature sensor 188 is monitored by the evaluation unit 206 of the window heat controller 197. When the temperature of the heatable member 32 exceeds a given temperature, e.g., but not limiting to the discussion because of arcing or an increase in the resistance of the coating 62, the heat controller 206 forwards a signal to the switch 198 along the cable 204 to open the switch 198 to electrically disconnect the power supply 74 and the heatable member 32 from one another. The invention is not limited to the cause of the heatable member 32 exceeding the predetermined temperature and any type of defect of the heatable member 32 that caused the predetermined temperature to be exceeded is included in the practice of the invention.

The discussion is now directed to a non-limiting aspect of the signal monitoring and detecting system 200 of the arc sensor 72. The arc monitoring and detecting system 200 is designed to detect and act on arcing, namely condition (b). Condition (b) is termed "major-arcing" and is defined as measured voltage/current exceeding a first predetermined level of voltage/current. The value of the first predetermined level is not limiting to the invention, and the value is selected such that arcing is visible with the unaided eye and/or based on prior experience can damage the window 14. In one non-limiting embodiment of the invention, the first predetermined level of voltage/current is based on the model of the window and the current needed to heat the window to remove fog, snow, and ice, and to prevent the formation of fog, snow, and ice, on the outer surface 43 of the window 14.

Consider now the case when there is major arcing without the temperature exceeding the predetermined temperature. The arc monitoring and detecting system 200 detects major arcing and forwards a signal to the signal modifying system 216. The signal modifying system 216 forwards a signal along the wire 214 to open the switch 210. The control logic for a heat controller 206 determines that the switch 210 is in the open position and sends a signal along the cable 204 to open the switch 198 to electrically disconnect the power supply 74 and the heatable member 32 from one another. As can be appreciated by those skilled in the art, when there is major-arcing and the temperature of the heatable member 32 exceeds the predetermined temperature, the switch 210 and/or the switch 198 are opened.

Another type of arcing is known in the art as "micro-arcing" and is discussed in U.S. Pat. Nos. 9,166,400 and 8,981,265.

The discussion is now directed to a non-limiting aspect of the arc monitoring and detection system 200. The arc monitoring and detection system 200 is designed to, among other things, detect major-arcing, and take action to prevent or limit damage to the heatable member 32 and/or the window 14. The switch 198 and the switch 210 (see FIG. 13) are of the type that open and close in response to signals forwarded to the switch. In the practice of the invention, the switch 198 is an electronic solid state switch. The control logic for a heat controller 206 of the window heat controller 197 is a comparator of the type that compares the electrical signal, e.g., in mV from the temperature sensor 188 to a set voltage range, and when the signal is outside of the range, the control logic of the heat controller 206 forwards a signal to open the switch 198, and when the signal is within the range, the control logic for a heat controller 206 sends a signal along the wire 204 to close the switch 198.

Figure 14:
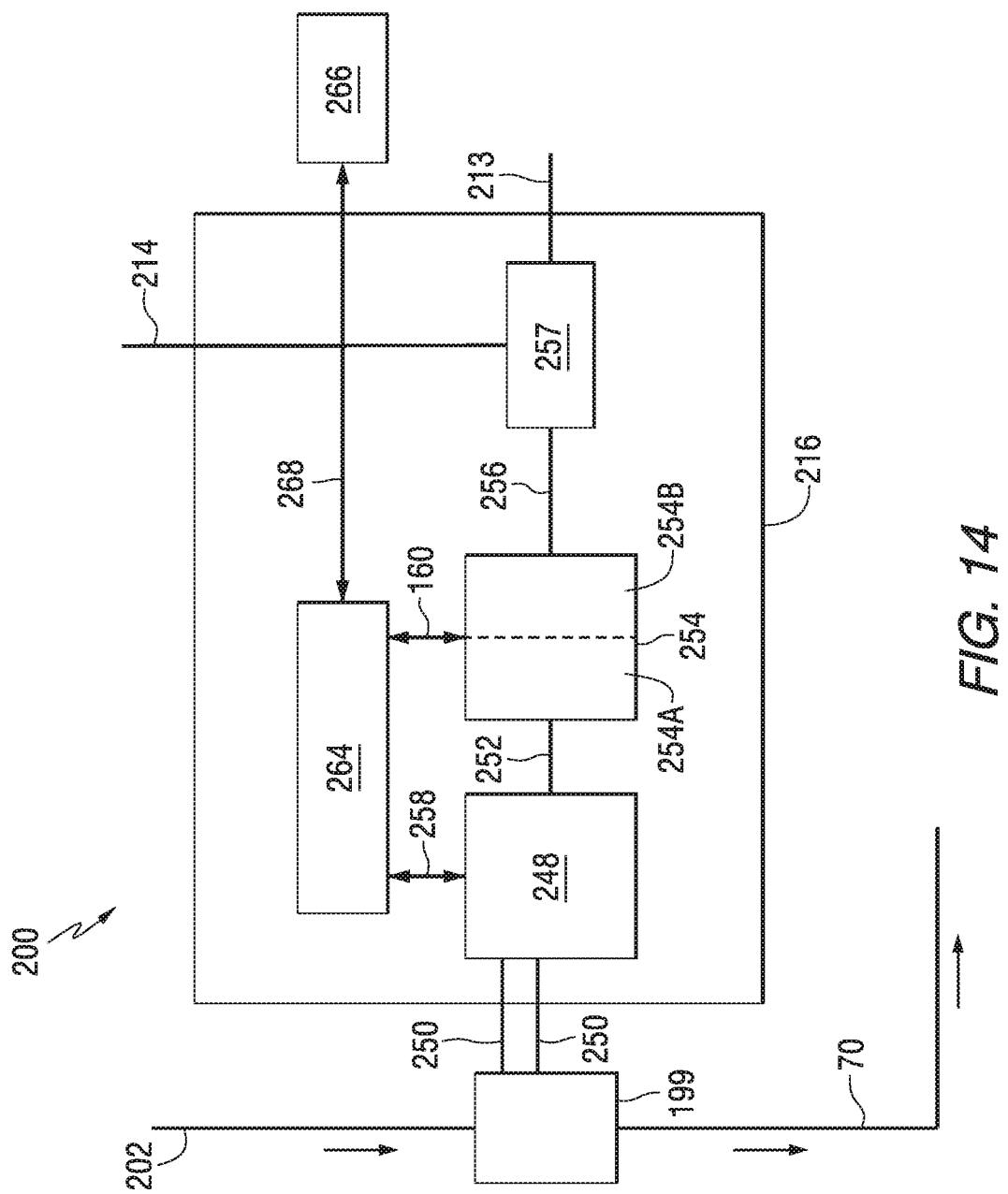
FIG. 14 is a block diagram of a non-limiting embodiment of an arc monitoring system of the invention showing the sensory portion and the evaluation unit of the arc sensor.

With reference to FIG. 14, the discussion is now directed to the arc detecting and monitoring system or arc sensor 200 to detect major and optionally micro-arcing, and take action to prevent or minimize damage to the heatable member 32 and/or the window 14 (see FIGS. 2 and 3). As shown in FIGS. 13 and 14 as needed, the current transformer 199 is connected to the wires 202 and 70, and the output of the transformer 199 passed onto the filter 248 by the wires 250. The invention is not limited to the type of transformer 199 used in the practice of the invention. In the preferred practice of the invention, the current transformer 199 was of the type to reduce the current to a lower level for ease of filtering the current moving along the wires 202 and 70. More particularly, the current transformer 199 produces a reduced current accurately proportional to the current passing through the wires 202/70 to the heatable member 32. For example, in one non-limiting embodiment of the invention, the current passing through the heatable member 32 was 18.5 amperes and the output of the current transformer 199 was 1.85 amperes.

With continued reference to FIG. 14, signal filter 248 of the signal filtering and modifying system 216 is a high pass filter to effectively eliminate electrical and magnetic noises from the signals passing along the wire 250. The filter level of the signal filter 248 is based on noise spectral analysis of the electrical system, i.e., the current passing from the power supply 74 to the heatable member 32. The filter 248 also reduces the magnitude of the line signal due to elimination of the high frequency component, e.g., but not limiting to the invention by 2 levels.

The signal from the signal filter 248 is passed onto a two stage filter 254. The first stage filter 254A includes a comparator to filter out signals having voltage/current levels above the first predetermined level, e.g., 150 mV indicating major arcing. When the signal of the first stage filter 254A exceeds the first predetermined level, the time that the signal exceeds that first predetermined level is counted by 254B. Once the time counted in 254B exceeds a certain predetermined quantity, a signal is sent along wire 256 to signal switch 257 that major arcing has been detected, and the signal switch 257 sends a signal along the wire 214 to open the switch 210, which causes the control logic for the heat controller 206 to open the switch 198 (see FIG. 13) to prevent the current from moving from the power supply 74 to the heatable member 32 as discussed above.

With continued reference to FIG. 14, the signal filter 248 and the dual filter 254 are each connected by wires 258 and 260, respectively, to a micro-computer 264. Optionally, the micro-computer 264 is connected to an electronic storage 266 of the aircraft by wire or cable 268. The micro-computer 264 sets the level, e.g., the second predetermined level for the filter 248, to filter the noise from the signal from the current transformer 199, sets the level, e.g., the first predetermined level for the filter 254A to identify major-arcing. The electronic storage 266 maintains a history of the activities of the filter 248 and two stage filter 254 to provide data for setting the predetermined first level indicating micro-arcing, the second predetermined level indicating noise level in the signal from the transformer 199, and the micro arc count and time period to indicated a potential problem due to micro-arcing.

With the arrangement discussed above, the sensory portion of the coating temperature sensor 190 is a thermistor 270, however the invention is not limited to the type of temperature sensing technology and could be infrared monitoring, a thermocouple, etc. As can be appreciated, the invention can be practiced with more or less than four temperature sensor sensory portions 190. More particular, increasing the number of temperature sensor sensory portions, e.g., using 5, 6, 7, 10, or 20 temperature sensor sensory portions, increases the accuracy of monitoring the distributed temperature, and using less than 4, e.g., 1, 2, 3 sensors, decreases the accuracy monitoring the distributed temperature. For purposes of clarity, the sensory portion of the coating temperature sensor 190 is identified by the number 267. The evaluation unit of the coating temperature sensor 190 is the heat controller 197 and the switch 210. For purposes of clarity, the evaluation unit of the coating temperature sensor 190 is identified by the number 270.

The sensory portion of the arc sensor 72 is the current transducer 199. The evaluation unit of the arc sensor 72 is the circuit designed by the number 200 in FIG. 14.

From the above discussion and arrangement of the coating temperature sensor and the arc sensor, it can be appreciated that the coating temperature sensor 190 and the arc sensor are generally considered activating sensors (discussed above) because they are performance monitoring and action taking sensors. More particularly, when the conductive coating 62 of the heatable member 32 exceeds a desired temperature, the switch 210 automatically acts to arrange a disconnect between the electric power, e.g., the electric power source 74, and the heatable member 32, and when the arc monitoring and detecting system 200 determines that there is excessive arcing, the arc monitoring and detection system acts on the window heat controller 197 to arrange a disconnect between the electric power, e.g., the electric power source 74 and the heatable member 32.

As can now be appreciated, the invention is not limited to the impact sensor, the rupture sensor, the moisture sensor, the arc sensor, and the conductive coating temperature sensor discussed above, and is directed to any type of sensor, for example also includes, but is not limited to static sensors, vibration sensors, and transmission sensors. Further, but not limiting to the invention, the evaluation unit of the sensors are the electronics and can be classified as the portion of the sensor that acts on the signals from the sensory portion of the sensor to determine the operating performance of the component being monitored, e.g., but not limited to the windshield 14. The sensory portion is the portion of the sensor that measures properties of a component, e.g., but not limited to the windshield 14, and is monitored by the evaluation unit of the sensor to make changes to the sensory portion. Still further, the invention contemplates an active computer memory to store the information from the window sensor system both in real time and history, e.g., but not limited to the electronic storage 266 shown in FIG. 14. As can be appreciated by those skilled in the electronic storage art, the electronic storage 266 can include, but is not limited to, an electronics circuit structure that can support multi-input and multi-output sensor system; an embedded microcomputer that can be programmed to perform intelligent solution based on a mathematical model frame work, and/or communication capability to electronically transmit the window status/conditions to the aircraft center diagnosis computer system.

Present Practice for Mounting Sensors to Windshields

The subject matter of interest to the present discussion is the present practice to position the sensory portion, and the evaluation unit of the sensors on the aircraft window. In the following discussion, the sensors are monitoring an aircraft windshield. The invention, however, is not limited thereto, and the invention can be practiced on any type of vehicle window.

The electric power supply to operate the sensors is not generally mounted on the windshield, but is mounted on the aircraft and connected in any convenient manner to sensors mounted on the windshield. As can be appreciated, electric power in the form of small size battery, e.g., D type, C type, double A type, triple A type, and/or disc type battery, can be mounted on the windshield. In the following discussion of the non-limiting aspect of the invention, the electric power supply is provided by an electric source, e.g., power source 74, mounted on the airplane and connected to the windshield in any convenient the manner.

Figure 15:
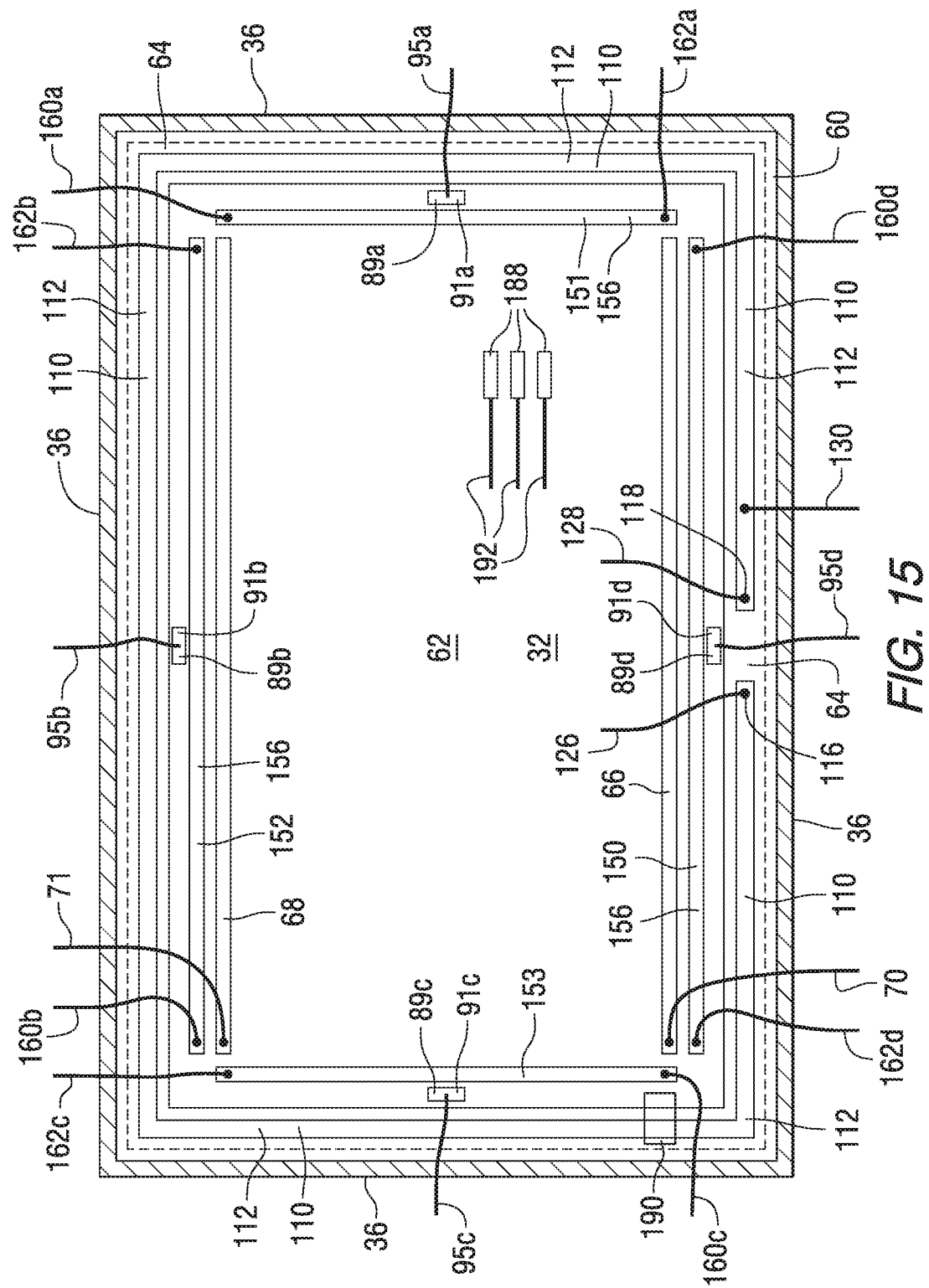
FIG. 15 is a view of a heating arrangement showing the sensory portion and the evaluation unit of the impact sensor, rupture sensor, moisture sensor, temperature sensor, and arc sensor.
Figure 16:
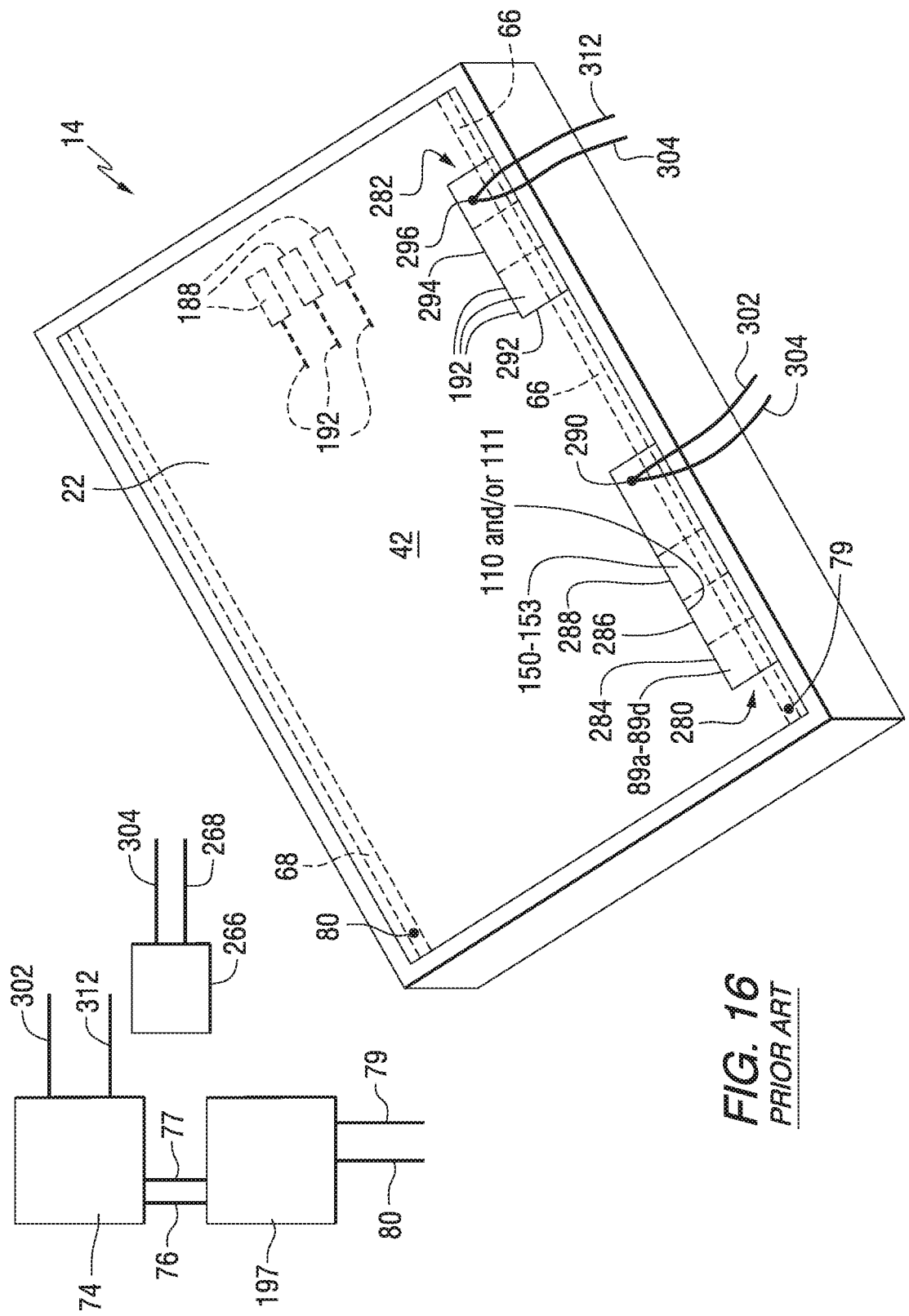
FIG. 16 is an isometric view of a windshield of the prior art showing connectors on the inner surface of windshield to connect electric power and electrical equipment discussed herein to the impact sensor, rupture sensor, moisture sensor, temperature sensor, and arc sensor, and to monitor several aspects of the heating arrangement.

Shown in FIG. 15 is a plan view of a portion of a currently available windshield showing only the glass sheet 60, the conductive coating 62, the bus bars 66 and 68 (see FIG. 2), and the sensory contacts of the impact sensor, the rupture sensor, the moisture sensor, the arc sensor, and the conductive coating temperature sensor. FIG. 16 is a view of the windshield of FIG. 15 showing the evaluation units of the impact sensor, the rupture sensor, the moisture sensor, the arc sensor, and the conductive coating temperature sensor mounted on the surface 42 of the glass sheet 22 (see FIG. 2) of the windshield 14 facing the interior of the aircraft 10 (see FIG. 1). With continued reference to FIG. 15, there is shown the piezoelectric crystals 91a-91d of the impact sensors 89a-89d (see FIGS. 4 and 5) connected to the wires or electrical conductors 95a-95d. The electric conductor strip 112 of the rupture sensor 110 (see FIGS. 6 and 8) having the leads or electrical conductor 126 and 128 connected to the first and second terminal surfaces 116 and 118, respectively, and the lead 130 to provide contact to the electrical power system 74 or 120 (see FIG. 6) as discussed above. The electrically conductive layer 156 of the moisture sensors 150-153 having the wires or electrical conductors 160a-160d to one end of each of the four electrically conductive layers 156 and the wires or electrical conductors 162a-162d connected to the opposite end of the four electrically conductive layers 156 (see FIGS. 9-11) as discussed above. As shown in FIGS. 15 and 16, the three conductive coating temperature sensors 188 are mounted on the conductive coating 62 (see also FIGS. 13 and 14) to measure the temperature of the conductive coating 62.

With reference to FIG. 16, mounted, preferably securely mounted on the inner surface 42 of the windshield 14 as mounted on the aircraft body 87 (see FIG. 1), are electrical connectors 280 and 282 to provide external electrical access to selected sensors, and/or to provide electrical power input to operate the evaluation unit and/or the sensory portion. The connector 280 has an integrated circuit or an electronic chip of the evaluation unit of the impact sensors 89a-89d designated by the number 284; of the evaluation unit of the rupture sensor 110 and/or 111 designated by the number 286, and of the evaluation unit of the moisture sensors 150-153 designated by the number 288. As can be appreciated, the invention is not limited to the number or types of sensors described above.

The electronic chips 284, 286, and 288 are connected to connection area 290 of the connector 280. The connection area 290 of the connector 280 functions as a connection to an electric power supply, e.g., but not limited to wire 302, interconnecting the electric current supply 74 and the impact, rupture, and moisture sensors to power the evaluation units of the impact, rupture, and moisture sensors. Wire 304 is a connection for passing electric signals to alter the settings of the sensory portion and/or the evaluation unit of the impact, rupture, and moisture sensors under discussion, and as a passageway, e.g., but not limited to a passageway along the wire 304 to the electronic storage unit 266 (see FIGS. 14 and 16), to collect and store data in the electronic storage unit 266 provided by the impact, rupture, and moisture sensors.

With continued reference to FIG. 16, the connector 282 securely mounted on the inner surface 42 of the windshield 14 has a chip 292 of the evaluation unit 270 of the coating temperature sensor 190, a chip 294 of the evaluation unit of the arc sensor 72, and a connection area 296. In another non-limiting embodiment of the invention, all the sensory portions are monitored and evaluated by a single evaluation unit. Wire 312 connects the connector 282 to an electric power supply, e.g., the electric current supply 74, and connects the arc sensor 72, and the coating temperature sensor 190 to the current supply to power the evaluation units 274 of the arc sensor 72 and the coating temperature sensor 190. The wire 304 of the connector 282 is a connection for passing electric signals to alter the setting of the sensory portion 272 and/or the evaluation unit of the of the arc sensor and the coating temperature sensor, and as a passageway, e.g., but not limited to a passageway along the wire 304 to the electronic storage unit 266 (see FIGS. 14 and 16), to collect and store data generated by the arc sensor and the coating temperature sensor.

The invention is not limited to the chip or integrated circuit, and any of the chip and integrated circuit technology known in the art can be used to provide the evaluation unit of the impact sensor, the rupture sensor, the moisture sensor, the arc sensor, and the coating temperature sensor to an electronic chip or integrated circuit. Further, converting the evaluation unit of the impact sensor, the rupture sensor, the moisture sensor, the arc sensor, and the temperature sensor to an electronic chip is well known in the art and no further discussion is deemed necessary.

The cable 192 of the temperature sensors 188 (shown bundled in FIG. 13) are connected to the electronic chip 292. The electronic chip 292 includes the switch 210 (see FIG. 13) and electronic circuit to measure the temperature of the coating 62 and to act on the switch 210 as discussed above. The chip 294 includes the evaluation unit of the arc sensor, and is connected to the switch 210 to open and close the switch 210 as discussed above.

The electronic chips 292 and 294 are connected to the connection area 296 of the connector 282. The connection area 296 provides a connection to an electric power supply, e.g., but not limiting to the invention, wire 312 interconnects the electric current supply 74, and the temperature sensor and arc sensor to power the evaluation unit and sensory portion of the temperature sensor and of the arc sensor.

As can now be appreciated, it is the present practice to mount the sensory portion, and the evaluation unit, of the sensors on the same window, e.g., the same windshield.

Non-Limiting Aspects of the Invention

In a non-limiting aspect of the invention, sensors each having a sensory portion and an evaluation unit is provided (see above discussion). The sensory portion of the sensors is mounted in the construction of a vehicle window, e.g., an aircraft windshield as discussed above, and the evaluation unit of the sensor is not mounted on the aircraft windshield with the sensory portion of the sensor, but is mounted elsewhere, e.g., but not limiting to the invention, in a cabinet mounted in the aircraft for storage of electrical circuit boards, and/or on the body of the aircraft and/or in a geographic area outside of the aircraft. The invention further contemplates mounting the evaluation unit of the arc sensor outside of the aircraft and having wireless communication between the sensory portion and the evaluation unit of the sensor. By way of illustration and not limiting to the invention, the evaluation unit of an arc sensor can be maintained in a central control area in a specified geographical area, and communications with the sensory portion of the arc sensor can be by wireless communication, e.g., as disclosed in U.S. Pat. No. 8,383,994, which patent in its entirety is hereby incorporated by reference. Wireless communication is well known in the art and in no further discussion is deemed necessary.

Shown in FIG. 17 is a non-limited aspect of a windshield of the invention identified by the number 320. The windshield 320 is similar to the windshield 14 shown in FIG. 16 except that the evaluation unit 93a-93d of the impact sensors 89a-89d, respectively; the evaluation unit 122 of the rupture sensor 110 (FIG. 6) and/or 111 (FIG. 8); the evaluation unit 170 of the moisture sensors 150-153; the evaluation unit 270 of the coating temperature sensor 190, and the evaluation unit 274 of the arc sensor 72 are not mounted on the windshield; they are mounted in a cabinet 330 shown in FIG. 17 and located on the airplane 10. Although not limiting to the invention, in one non-limiting aspect of the invention, the evaluation units are mounted in the cabinet 330 with the window heat controller 197 and the electronic storage 266. The electric power supply 74 is connected to the evaluation units 93a-93d, 122, 170, 270, and 2274, to the heat controller 197, and to the electronic storage 266, in the cabinet 330 by the wires 76 and 77 in the manner discussed above. In another non-limiting aspect of the invention, the evaluation units and electronic storage are mounted within the window heater controller itself.

In another non-limiting aspect of the invention, the electric circuit for the evaluation unit of the arc sensor and the evaluation unit of the coating sensor can share electric components as shown in FIGS. 13 and 14. Further, the electric circuit for the elevation unit of the arc sensor, the evaluation unit of the coating sensor, and the heat controller 197 can share electric components as shown in FIGS. 13 and 14.

With reference to FIG. 16, the connectors 280 and 282 are shown having the evaluation units in FIG. 16 replaced in FIG. 17 by one or more connection areas that do not have the evaluation units of the sensors. More particularly, in one non-limiting aspect of the invention, the evaluation unit 93a-93d of the impact sensor 89a-89d is connected to wire 350; the evaluation unit 170 of the rupture sensor 122 is connected to wire 352, and the evaluation unit 170 of the moisture sensor 150-153 is connected to wire 354, and the wires 350, 352 and 354 bundled (identified by the number 356), and the bundled wire 356 electrically connected to connection area 360 of connector 362. The evaluation unit 270 of the coating temperature sensor 190 is connected to the wire 362, the evaluation unit 274 of the arc sensor 72 is connected to the wire 364, and the wires 362 and 364 are bundled (identified by the number 366), and the bundled wire 366 electrically connected to connection area 370 of connector 372.

The electronic storage 266 is electrically connected to the evaluation unit within the cabinet 330. Wires 376 and 378 are connected within the cabinet 330 to the electrical power supply 74 by way of wires 76 and 77 and at the opposite end to the connection area 370 of the connector 372. Internal wires (not shown) of the windshield 320 connect the wires 376 and 378 in the connection area 370 to the wires 79 and 80 connected to the bus bars 66 and 68. As can be appreciated, the invention is not limited to the manner in which the wires are connected to the connection areas 360 and 370 of the connectors 362 and 372, respectively, and any type of connection can be used to secure the connection, e.g., and not limiting to the invention, the connection can be a connection having a hole and a bayonet insert.

As can now be appreciated, the evaluation units are removed from the windshield 14 to a cabinet 330 having in one aspect of the invention the window heat controller 197 and the electronic storage 266. The invention also contemplates the positioning of evaluation unit of one or more sensors, e.g., the evaluation units 93a-93d, 122 and 170 in connectors mounted on the inner surface of the windshield as shown in FIG. 16, and the positioning of the evaluation units 270 and 274 in the cabinet 330.

Figure 18:
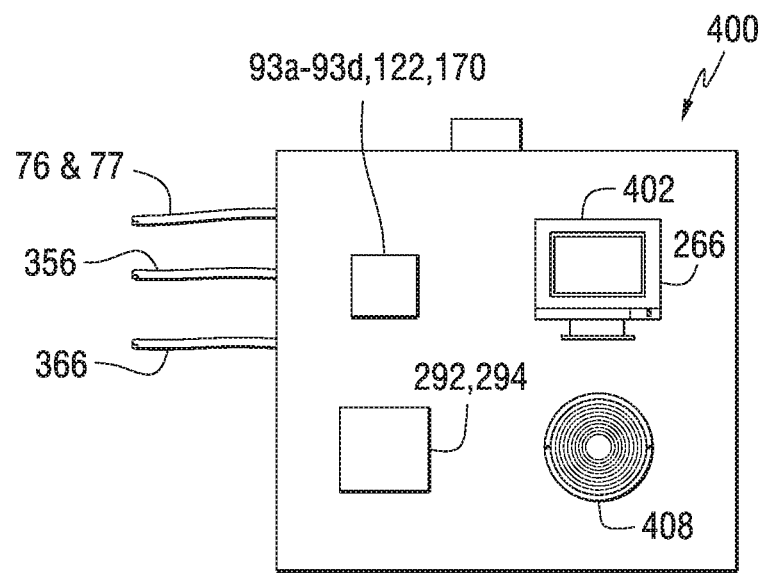
FIG. 18 is an elevated front view of a housing having a health monitoring system for the aircraft, the health monitoring system incorporating, among other things, features of the invention to monitor performance of selected components of a transparency, e.g., but not limited to an aircraft windshield, by, among other things, monitoring the evaluation unit of the impact sensor, rupture sensor, moisture sensor, temperature sensor, and arc sensor in accordance to the teachings of the invention.

With reference to FIG. 18, in another non-limiting aspect of the invention, the evaluation units are mounted in a housing 400 mounted in the interior of the airplane. Also mounted in the housing 400 is a computer 402 having a health monitoring system of the airplane 10. The housing 400 can further include a speaker and/or an alarm 408 to provide audible information regarding the performance of aircraft components being monitored.

In another non-limiting aspect of the invention, both the sensory portion and the evaluation unit of a sensor can be mounted in the housing 400 when the sensory portion does not require a measuring element. As a non-limiting example, the current transducer 199 (FIG. 14) can be mounted anywhere on the windshield power line, e.g., but not limited to power lines 70, 76 or 71, 77, connected to bus bar 66 or bus bar 68, respectively, at a location within the windshield heater controller 197. In this case, the windshield can have no measuring element or no embedded sensory portion of the sensor, but still obtain active sensor response through the use of the arc sensor sensory portion and evaluation unit within the heater controller.

More particularly, the sensory portion of the arc sensor monitors the current moving through the power lines 70, 76, or 71, 77 and the bus bars 66 and 68, and forwards a signal to the evaluation unit of the arc sensor to determine if there is arcing. The sensory portion of the other sensors, e.g., the rupture sensor, the impact sensor, a moisture sensor, and temperature sensor, includes the use of one or more measuring elements. For example and not limiting to the discussion, the sensory portion of the rupture sensor has a conductive strip 112 (see FIG. 6) on the heatable member 32. The conductive strip 112 forwards a signal to the evaluation unit of the rupture sensor to monitor the performance of the windshield. With the above arrangements, it can be appreciated that the sensory portion of the arc sensor only requires an electrical connection to the power lines or bus bars to monitor the performance of the heatable member 32 and, therefore, the electrical connection can be made to the electric circuit of the heatable member, which includes but is not limited to an electrical connection to the heater controller 197.

As can now be appreciated, the evaluation unit of the sensor can be contained in one circuit, e.g., but not limiting to the invention, one circuit board, or can be on two or more circuit boards. By way of illustration and not limiting to the invention, the heat controller 197 (FIG. 13) and the evaluation unit 274 of the arc sensor 72 can be on one circuit board (see FIG. 17) and the remaining components of the evaluation unit of the arc sensor can be on another circuit board as shown in FIG. 17.

Further, the invention is not limited to the aspects of the invention presented and discussed above which are presented for illustration purposes only, and the scope of the invention is only limited by the scope of the following claims and any additional claims that are added to applications having direct or indirect lineage to this application.

What is claimed is:

1. A windshield monitoring system, comprising:
a windshield comprising a heating arrangement for removing fog, ice, and/or snow from the windshield, the heating arrangement comprising a pair of spaced bus bars and an electrically conductive coating covering at least a portion of the windshield extending between and in electrical contact with the spaced bus bars;
a cabinet configured to store one or more electronic devices spaced apart from and in electrical contact with the windshield via at least one power line;
a power supply electrically connected to the windshield through the at least one power line, the power supply being configured to provide electrical current through the bus bars and through the electrically conductive coating to heat the electrically conductive coating, thereby heating at least an outer surface of the windshield;
an arc sensor comprising a sensory portion electrically connected to and configured to detect voltage or current of a signal passing through the at least one power line from one of the bus bars and an evaluation unit in the cabinet configured to disconnect the power supply from the heating arrangement based on the voltage or current detected by the sensory portion of the arc sensor;
at least one temperature sensor comprising a sensory portion connected to the windshield configured to generate a signal representative of a temperature of at least a portion of the windshield and an evaluation unit in the cabinet configured to act on the signal generated by the sensory portion of the temperature sensor; and
a first switch electrically connecting the power supply to one of the bus bars of the heating arrangement,
wherein the first switch in a closed position provides a continuous electrical path from the power supply through the first switch to the conductive coating and the first switch in an open position electrically separates the power supply from the conductive coating, and
wherein the evaluation unit of the at least one temperature sensor is configured to cause the first switch to open when the signal generated by the sensory portion of the at least one temperature sensor indicates that the temperature of the windshield exceeds a predetermined temperature.

2. The windshield monitoring system of claim 1, wherein the windshield is a windshield of a vehicle, and wherein the cabinet is located in the vehicle.

3. The windshield monitoring system of claim 1, wherein the evaluation unit of the arc sensor is configured to disconnect the power supply from the bus bar when the detected voltage or current indicates an increase in a resistance of the conductive coating of the heating arrangement.

4. The windshield monitoring system of claim 1, further comprising a second switch electrically connecting the sensory portion of the at least one temperature sensor to the cabinet,
wherein the second switch in a closed position electrically interconnects the at least one temperature sensor and the cabinet, and in an open position disconnects the cabinet and the at least one temperature sensor, and
wherein the evaluation unit of the arc sensor is configured to operate the second switch to transition the second switch from the closed position to the open position when the detected voltage or current of the electrical signal passing through the at least one power line exceeds a predetermined value.

5. The windshield monitoring system of claim 4, wherein, with the first switch and the second switch in the closed positions, a first electric path is provided from the power supply through the first switch to the heating arrangement of the windshield, and a second electrically conductive path is provided from the sensory portion of the at least one temperature sensor, through the second switch, to the cabinet.

6. The windshield monitoring system of claim 1, wherein the sensory portion of the at least one temperature sensor comprises a thermistor mounted to the conductive coating.

7. The windshield monitoring system of claim 1, further comprising an electronic storage device mounted in the cabinet, wherein the electronic storage device is configured to collect and store data received from the evaluation unit of the arc sensor.

8. The windshield monitoring system of claim 7, wherein the evaluation unit of the arc sensor is configured to receive performance history information for the conductive coating from the electronic storage device.

9. The windshield monitoring system of claim 1, wherein the windshield comprises at least one first sheet, at least one second sheet, and at least one interlayer disposed between the at least one first sheet and the at least one second sheet.

10. An aircraft comprising the windshield monitoring system of claim 1 and an aircraft body comprising an interior, wherein the windshield is mounted to the body and the cabinet is positioned in the interior of the aircraft body.

11. A windshield monitoring system of claim 1, comprising:
a windshield comprising a heating arrangement for removing fog, ice, and/or snow from the windshield, the heating arrangement comprising a pair of spaced bus bars and an electrically conductive coating covering at least a portion of the windshield extending between and in electrical contact with the spaced bus bars;
a cabinet configured to store one or more electronic devices spaced apart from and in electrical contact with the windshield via at least one power line;
a power supply electrically connected to the windshield through the at least one power line, the power supply being configured to provide electrical current through the bus bars and through the electrically conductive coating to heat the electrically conductive coating, thereby heating at least an outer surface of the windshield; and
an arc sensor comprising a sensory portion electrically connected to and configured to detect voltage or current of a signal passing through the at least one power line from one of the bus bars and an evaluation unit in the cabinet configured to disconnect the power supply from the heating arrangement based on the voltage or current detected by the sensory portion of the arc sensor,
wherein the sensory portion of the arc sensor comprises a current transformer electrically connected to the at least one power line, and
wherein the current transformer is configured to reduce the electrical signal passing through the power line to a reduced magnitude signal for improved filtering of the electrical signal passing from the bus bar to the power supply.

12. The windshield monitoring system of claim 11, further comprising at least one parameter sensor for measuring a parameter of the windshield, the at least one parameter sensor comprising a sensory portion in physical contact with the windshield and an evaluation unit in the cabinet, wherein the at least one parameter sensor is selected from a group of an impact sensor, a rupture sensor, a moisture sensor, a stress sensor, a temperature sensor, and a p-static sensor.

13. The windshield monitoring system of claim 11, further comprising at least one temperature sensor comprising a sensory portion connected to the windshield configured to generate a signal representative of a temperature of at least a portion of the windshield and the evaluation unit in the cabinet configured to act on the signal generated by the sensory portion of the temperature sensor.

14. The windshield monitoring system of claim 13, further comprising a first switch electrically connecting the power supply to one of the bus bars of the heating arrangement,
wherein the first switch in a closed position provides a continuous electrical path from the power supply through the first switch to the conductive coating and the first switch in an open position electrically separates the power supply from the conductive coating, and
wherein the evaluation unit of the at least one temperature sensor is configured to cause the first switch to open when the signal generated by the sensory portion of the at least one temperature sensor indicates that the temperature of the windshield exceeds a predetermined temperature.

15. The windshield monitoring system of claim 11, wherein the reduced magnitude signal output by the current transformer is proportional in magnitude to an electrical current passing from the power supply to the conductive coating.

16. The windshield monitoring system of claim 11, wherein the reduced magnitude signal output by the current transformer is passed to a high pass filter which filters the signal to reduce or eliminate electrical or magnetic noises from the signal.

17. A windshield monitoring system, comprising:
a windshield comprising a heating arrangement for removing fog, ice, and/or snow from the windshield, the heating arrangement comprising a pair of spaced bus bars and an electrically conductive coating covering at least a portion of the windshield extending between and in electrical contact with the spaced bus bars;
a cabinet configured to store one or more electronic devices spaced apart from and in electrical contact with the windshield via at least one power line;
a power supply electrically connected to the windshield through the at least one power line, the power supply being configured to provide electrical current through the bus bars and through the electrically conductive coating to heat the electrically conductive coating, thereby heating at least an outer surface of the windshield; and
an arc sensor comprising a sensory portion electrically connected to and configured to detect voltage or current of a signal passing through the at least one power line from one of the bus bars and an evaluation unit in the cabinet configured to disconnect the power supply from the heating arrangement based on the voltage or current detected by the sensory portion of the arc sensor,
wherein the evaluation unit of the arc sensor is configured to compare the voltage or current detected by the sensor portion of the arc sensor to a predetermined value, determine an amount of time that the detected voltage or current exceeds the predetermined value, and determine that major arcing is occurring when the determined amount of time exceeds a predetermined time value.

18. The windshield monitoring system of claim 17, wherein the windshield is a windshield of a vehicle, and wherein the cabinet is located in the vehicle, and
wherein the windshield comprises at least one first sheet, at least one second sheet, and at least one interlayer disposed between the at least one first sheet and the at least one second sheet.

19. The windshield monitoring system of claim 17, wherein the evaluation unit of the arc sensor is configured to disconnect the power supply from the bus bar when the detected voltage or current indicates an increase in a resistance of the conductive coating of the heating arrangement.

20. The windshield monitoring system of claim 17, further comprising an electronic storage device mounted in the cabinet, wherein the electronic storage device is configured to collect and store data received from the evaluation unit of the arc sensor.

* * * * *